(12) United States Patent
Sagawa et al.

(10) Patent No.: US 6,461,239 B1
(45) Date of Patent: *Oct. 8, 2002

(54) MUSIC ACTION GAME MACHINE, PERFORMANCE OPERATION INSTRUCTING SYSTEM FOR MUSIC ACTION GAME AND STORAGE DEVICE READABLE BY COMPUTER

(75) Inventors: Yuichiro Sagawa, Yamato (JP); Kiyoshi Mizuki, Zama (JP); Hideki Hashimoto, Yamato (JP)

(73) Assignee: Konami Co., Ltd., Kobe (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/709,021

(22) Filed: Nov. 8, 2000

Related U.S. Application Data

(62) Division of application No. 09/152,930, filed on Sep. 14, 1998.

(30) Foreign Application Priority Data

Sep. 17, 1997 (JP) .............................................. 9-252208
Jul. 21, 1998 (JP) ........................................... 10-218056

(51) Int. Cl.$^7$ ................................................ A63F 13/00
(52) U.S. Cl. ......................... 463/7; 463/23; 434/307 A
(58) Field of Search ............................. 463/1, 9, 7, 23, 463/30; 434/307 A, 307 R; 84/609, 615, 622

(56) References Cited

U.S. PATENT DOCUMENTS 5,233,521 A * 8/1993 Kimpara ...................... 84/609

(List continued on next page.)

FOREIGN PATENT DOCUMENTS

| JP | 62-26000 | * | 2/1987 |
| JP | 05-158480 A | * | 6/1993 |
| JP | 05216476 A | * | 8/1993 |
| JP | 08-305356 A | * | 11/1996 |
| WO | WO 97/01168 | * | 1/1997 |

OTHER PUBLICATIONS

Yamaha News Release, dated Jul. 1997, in Japanese with English Abstract.

Primary Examiner—Jessica Harrison
Assistant Examiner—John M. Hotaling, II
(74) Attorney, Agent, or Firm—Jordan and Hamburg LLP

(57) ABSTRACT

The music action game machine comprises: a main body; an operation input device disposed on a front side of the main body so as to be adjacent to hands of a player facing the front side of the main body, the operation input device having a plurality of operation members; a storage device for storing data of a musical composition and data of a performance procedure associated with the musical composition; a music play device for playing the musical composition based on the data stored in the storage device; an operation instructing device for giving the player a visual instruction to operate the operation members in accordance with progress of a play of the musical composition based on the data stored in the storage device; an effect producing device for producing a performance effect in response to a performance operation performed by the player to each of the operation members; an estimation device for estimating the performance operation of the player based on a relationship between the performance procedure defined by the data stored in the storage device and the performance operation of the player; and an estimation informing device for informing the player of an estimation result determined by the estimation device. Therefore, the player can enjoy the simulation of the performance of the music through the operation of the operation members.

12 Claims, 19 Drawing Sheets

U.S. PATENT DOCUMENTS

| | | | |
|---|---|---|---|
| 5,350,882 A | * 9/1994 | Koguchi et al. | 84/636 |
| 5,512,704 A | * 4/1996 | Adachi | 84/605 |
| 5,739,457 A | * 4/1998 | Devecka | 84/743 |
| 5,824,933 A | * 10/1998 | Gabriel | 84/609 |
| 5,886,273 A | * 3/1999 | Haruyama | 84/478 |
| 5,925,843 A | * 7/1999 | Miller et al. | 84/609 |
| 6,001,013 A | * 12/1999 | Ota | 463/7 |
| 6,008,783 A | * 12/1999 | Kitagawa et al. | 84/478 |
| 6,025,552 A | * 2/2000 | Mukaino et al. | 84/605 |
| 6,031,174 A | * 2/2000 | Takabayashi | 84/609 |
| 6,149,523 A | * 11/2000 | Yamada et al. | 463/31 |

\* cited by examiner

FIG. 8

MUSICAL COMPOSITION X                   TB

| OPERATION MEMBERS | PHRASE F1 | PHRASE F2 | PHRASE F3 | |
|---|---|---|---|---|
| KEY A | SOUND EFFECT 1 | SOUND EFFECT 11 | SOUND EFFECT 1 | |
| KEY B | SOUND EFFECT 2 | SOUND EFFECT 12 | SOUND EFFECT 2 | |
| KEY C | SOUND EFFECT 3 | SOUND EFFECT 13 | SOUND EFFECT 3 | |
| KEY D | SOUND EFFECT 4 | SOUND EFFECT 14 | SOUND EFFECT 4 | ······ |
| KEY E | SOUND EFFECT 5 | SOUND EFFECT 15 | SOUND EFFECT 5 | |
| ADLIB KEY A | SOUND EFFECT 6 | SOUND EFFECT 16 | SOUND EFFECT 16 | |
| ADLIB KEY B | SOUND EFFECT 7 | SOUND EFFECT 17 | SOUND EFFECT 17 | |
| ADLIB KEY C | SOUND EFFECT 8 | SOUND EFFECT 18 | SOUND EFFECT 18 | |

DATA SET OF MUSICAL COMPOSITION X

WAVE FORM DATA

WAVE FORM TABLE DATA

MUSIC ACTION GAME MACHINE, PERFORMANCE OPERATION INSTRUCTING SYSTEM FOR MUSIC ACTION GAME AND STORAGE DEVICE READABLE BY COMPUTER

This application is a division of Ser. No. 09/152,930, filed Sep. 14, 1998.

BACKGROUND OF THE INVENTION

1. Field of the Invention

The present invention relates to a music action game machine whereby a player can enjoy performing operations in time with music, an operation instructing system suitable for the music action game machine and the storage device readable by a computer.

2. Description of the Related Art

Recently, disc jockeys who perform operations to remix music with sound effects become popular mainly in the younger generation. However, there are no game machines directed to provide the player with pleasure of simulating the disc jockeys.

SUMMARY OF THE INVENTION

One of objects of the present invention is to provide a music action game machine capable of providing the player with pleasure of performing operations in time with music.

In order to attain the above object, there is provided a music action game machine comprising:

a main body;

an operation input device disposed on a front side of the main body so as to be adjacent to hands of a player facing the front side of the main body, the operation input device having a plurality of operation members;

a storage device for storing data of a musical composition and data of a performance procedure associated with the musical composition;

a music play device for playing the musical composition based on the data stored in the storage device;

an operation instructing device for giving the player a visual instruction to operate the operation members in accordance with progress of a play of the musical composition based on the data stored in the storage device;

an effect producing device for producing a performance effect in response to a performance operation performed by the player to each of the operation members;

an estimation device for estimating the performance operation of the player based on a relationship between the performance procedure defined by the data stored in the storage device and the performance operation of the player; and an estimation informing device for informing the player of an estimation result determined by the estimation device.

According to the above-mentioned game machine, when the player operates at least one of the operation members in association with the music, the performance effect corresponding to the operation is mixed on the music. Therefore, the player can take pleasure in performing the music. Since the data of the performance procedure is stored in advance and correct timing to operate each operation member is indicated to the player through the operation instructing device in a visual manner, the player only has to operate the operation members in accordance with the instruction given from the game machine. Therefore, even if the player who is not skilled in performance of the music can enjoy the game easily. Since the operation of the player is estimated by the game machine and the result thereof is informed to the player, it is possible to enhance the competitive character of the game by changing difficulty of the game variously.

The operation input device may comprise a disk-shaped operation member as one of the operation members, and the disk-shaped operation member may be operable so as to be turned about an axis thereof.

The effect producing device may produce a scratch sound effect as the performance effect in response to a turning operation of the disk-shaped operation member, and said scratch sound effect may be similar to an actual scratch sound produced by irregularly turning a phonograph record disk with keeping contact between the phonograph record disk and a stylus of a phonograph player.

The operation instructing device may comprise: an indicator disposed on the front side of the main body and provided with at least one track extending in a predetermined direction; and a mark indicating device capable of indicating index marks, each of which is provided for indicating operation timing of each of the operation members, in such a manner that each of the index marks moves along the track and then reaches to a fixed operation position defined in the track when the operation timing associated with each of the index marks comes.

The mark indicating device may change a length of each of the index marks in said predetermined direction in accordance with a length of an operation continuation time during which each of the operation members must be operated.

In this case, it is possible to request more various performance procedure in comparison with in the case that only the operation timing is indicated to the player. This embodiment is more effective when combined with the above-mentioned disk-shape operation member.

A plurality of tracks may be provided as said at least one track, and said tracks may be arranged side by side with each other so as to accord with an arrangement of the operation members. In this case, the operation members corresponds to respective tracks different from each other.

An illumination device may be provided on the front side of the main body, and the effect producing device may control an illumination of the illumination device in response to the performance operation of the player.

A loud speaker may be provided on the front side of the main body, and the illumination device may comprise a loud speaker illuminator surrounding an outer periphery of the loud speaker.

A relationship between each of the operation members and the performance effect to be produced in response to the operation thereto may be changed in accordance with the progress of the play of the musical composition.

The estimation device may estimate the performance operation each time the performance operation is actually performed during the play of the musical composition, and the estimation informing device may inform the estimation result each time the estimation device determines the estimation result.

The estimation device may estimate the performance operation with referring to a relationship between the performance procedure stored in the storage device and a length of an operation continuation time during which each of the operation members must be operated The main body may have a plurality of operating sections, each of which is provided with the operation input device;

the estimation device may estimate the performance operation separately for each of the operating sections; and the estimation informing device may inform the estimation result separately for each of the operating sections.

The estimation device may calculate a score in accordance with superiority of the performance operation, and the estimation informing device may inform the calculated score.

The data storage device may store a plurality of data sets, each of which includes the data of the musical composition and the data of the performance procedure; and said game machine may further comprise a stage progress management device for controlling progress of a game in such a manner that when the estimation device gives a predetermined level of estimation with respect to the performance operation in one stage in which the musical playing device plays the musical composition based on one of the data sets, the game is allowed to progress to a next stage in which the music play device plays the musical composition and the instructing device instructs the performance operation based on another one of the data sets.

The effect producing device may produce a reaction effect as one type of the performance effect when the game reaches to an end of said one stage, and the reaction effect may be changed in accordance with the estimation result at the end of said one stage.

The operation instructing device may make a decision as to whether or not operation timing of each of the operation members comes, and instruct the performance operation to the player in a different visual manner in accordance with a result of said decision. In this case, the operation timing may have a certain width of time.

The estimation device may make a decision as to whether or not operation timing of each of the operation members comes, and estimate the performance operation when it is judged that the operation timing comes.

The operation instructing device may make a decision as to whether or not operation timing of each of the operation members comes, and change a standard, with which the performance operation is estimated, in accordance with a result of said decision.

The estimation device may estimate the performance operation based on a difference between timing of the performance operation defined by the data of the performance procedure and timing at which the player actually performed the performance operation.

The effect producing device may produce effects different from each other in response to respective operations of the operation members, and each of the effects corresponds to the performance effect.

The effect producing device may produce a reaction effect as one type of the performance effect each time the estimation device determines the estimation result, and the reaction effect may by changed in accordance with the estimation result.

The effect producing device may produce a predetermined sound effect so as to remix sounds of the musical composition with the sound effect in accordance with the performance operation.

The storage device may store a data set including the data of the musical composition and a plurality of operation data sections associated with the musical composition, each of the operation data sections corresponding to the data of the performance procedure; at least one of the operation data sections may be prepared so as to make difficulty with respect to the performance procedure defined thereby easier than that defined by another one of the operation data sections; and the operation instructing device may select any one of the operation data sections and instructs the player to operate the operation members based on said selected one of the data sections.

In this case, it is possible to present selectively one of the plurality of the performance procedures to the player in accordance with the skill of the player. Therefore, the player can play the game with appropriate difficulty.

The performance procedure defined by said at least one of the operation data sections may be substantially equal to a procedure in which a part of operations to the operation members is omitted in comparison with the performance procedure defined by said another one of the operation data sections.

The storage device may store automatic play data for producing the performance effect corresponding to each of the operations which are omitted in comparison with the performance procedure defined by said another one of the operation data sections; and the game machine may further comprise an automatic play device capable of producing the performance effect based on the automatic play data independently of the performance operation of the player.

The music action game machine may further comprise an operational relationship control device for changing a relationship between operations of the operation members defined by the data of the performance procedure and the operation members which are designated to be operated through the instruction of the operation instructing device with respect to the same musical composition.

The operation instructing device may comprise:
  an indicator disposed on the front side of the main body, at lease one part of the indicator being provided with a plurality of tracks which extend in a predetermined direction and which correspond to the operation members, respectively; and
  a mark indicating device capable of indicating index marks,
  each of the index marks may correspond to each operation timing of the operation members which will come in a certain period from a present to future in a game, and the index marks may be disposed in the tracks so as to be arranged from a predetermined position toward one side of the predetermined direction in accordance with time order therebetween.

The mark indicating device may be capable of changing an indication manner of the index marks between a first mode and a second mode, the first mode may be prepared to set a relationship between the index marks and the tracks equal to a relationship between the operation members and the operation timing defined by the data of the performance procedure, and a second mode may be prepared to set the relationship between the index marks and the tracks in a different manner from that of the first mode.

The estimation device may estimate the performance operation with interpreting that a relationship between the operation timing of each of the operation members defined by the data of the performance procedure and the performance operation to each of the operation members is changed in accordance with the relationship between the index marks and the tracks when in the second mode.

The mark indicating device may be capable of selecting a third mode in which the index marks are hidden in a specific range which extends from the predetermined position in the tracks toward said one side of the predetermined direction.

The main body may have a plurality of operating sections, each of which is provided with the operation input device; the operation instructing device may be capable of instructing the same performance procedure to each of the operating sections with respect to the same musical composition; the estimation device may estimate the performance operation separately for each of the operating sections; and the estimation informing device may inform the estimation result separately for each of the operating sections.

The main body may be provided with a plurality of operating sections arranged in a lateral direction thereof, each of the operating section being provided with the operation input device; the front side of the main body may be provided with a display device for displaying a game image; the operation instructing device may be capable of changing a display manner of the display device between a first display mode and a second display mode; the first display mode may be prepared to display images for indicating timing of the performance operation on a screen of the display device with leaving a space between each of the images in the lateral direction in accordance with an arrangement of the operating sections; and the second display mode may be prepared to display the images for indicating timing in such a manner that a space therebetween is less than that in the first display mode.

Each of the data of the musical composition and the data of the performance effect may be stored in the storage device as PCM data.

According to another aspect of the present invention, there is provided a music action game machine comprising:
 a main body;
 an operation input device disposed on a front side of the main body so as to be adjacent to hands of a player facing the front side of the main body, the operation input device having a plurality of operation members;
 a storage device for storing data of a performance procedure associated with a predetermined musical composition;
 an operation instructing device for giving the player a visual instruction to operate the operation members based on the data of the performance procedure stored in the storage device;
 an effect producing device for producing a performance effect in response to a performance operation of the player to each of the operation members;
 an estimation device for estimating the performance operation of the player based on a relationship between the performance procedure defined by the data stored in the storage device and the performance operation of the player; and
 an estimation informing device for informing the player of an estimation result determined by the estimation device.

According to still another aspect of the present invention, there is provided a music action game machine comprising:
 an operation input device having a plurality of the operation members and capable of issuing operation input signals different from each other in accordance with each of operations to the operation members;
 a storage device for storing data of a musical composition, data of a performance procedure with respect to each of the operation members of the operation input device, and data of sound effects corresponding to each of the operation members;
 a music play device for playing the musical composition based on the data of the musical composition stored in the storage device;
 an performance procedure presenting device for presenting the player with the performance procedure in a visual manner in association with a play of the musical composition based on the data of the performance procedure stored in the storage device;
 a sound effect producing device for producing the sound effects based on the operation input signals issued from the operation input device and the data of the sound effects stored in the storage device;
 an estimation device for estimating operations of the player based on the operation input signals issued from the operation input device and the data of the performance procedure stored in the storage device; and
 an estimation informing device for informing an estimation result determined by the estimation device.

Another one of objects of the present invention is to provide an operation instructing system suitable for instructing an operation of a music action game machine.

In order to attain the above object, there is provided a performance operation instructing system, which instructs a player to operate at least one operation member at a predetermined timing in association with progress of a play of a predetermined musical composition, comprising:
 an indicator provided with at least one track extending in a predetermined direction; and
 a mark indicating device capable of indicating index marks, each of which is provided for indicating operation timing of the operation member, in such a manner that each of the index marks moves along the track and then reaches to a fixed operation position defined in the track when the operation timing associated with each of the index marks comes.

According to the above-mentioned operation instructing system, it is possible to provide a music action game machine with a simple operation system such that the player may operate the operation member at timing when the index mark corresponding the operation member reaches to the fixed performance operation position. Therefore, the player may easily become accustomed to the operation of the game. Since the performance operation position is fixed, the player may concentrate on the game with fixing his eyes on a certain position in the indicator. It is not necessary for the player to move his eyes to follow each movement of each index mark.

The mark indicating device may change a length of each of the index marks in said predetermined direction in accordance with a length of an operation continuation time during which the operation member must be operated.

A plurality of operation members may be provided as said at least one operation member, and a plurality of tracks may be provided as said at least one track, said tracks being arranged side by side with each other so as to accord with an arrangement of the operation members.

Note that the instructing system of the present invention can be used in various types of the music game machines besides the game machine mentioned above.

Still another objects of the present invention is to provide a storage device which is readable by a computer and which stores a program and data necessary for performing a game in a music game machine.

In order to attain the above object, there is provided a storage device readable by a computer which stores data defining a procedure for operating operation members provided in a game system in association with a predetermined music, and a program for instructing a player to operate the operation members through a screen of a display device provided in the game system, and said program is prepared for causing the computer to execute steps of:

displaying an image of an instruction on the screen of the display device to operate the operation members based on the data defining the procedure;

producing a performance effect in response to an operation of the operation members performed by the player;

estimating the operation of the operation members based on a relationship between the data defining the procedure and the operation performed by the player; and informing a result of said estimating step to the player.

According to another aspect of the present invention, there is provided a storage device readable by a computer which stores data defining a procedure for operating operation members provided in a game system in association with a predetermined music, data of sound effects to be produced in association with operation input signals issued from the operation members in response to operations thereof, and a program for instructing a player to operate the operation members through a screen of a display device provided in the game system, and said program is prepared for causing the computer to execute steps of:

displaying an image of an instruction on the screen of the display device to operate the operation members based on the data defining the procedure;

producing at least one of the sound effects based on the operation input signals issued from the operation members and the data of the sound effects;

estimating operations performed by the player based on the operation input signals issued from the operation members and the data defining the procedure; and informing a result of said estimating step to the player.

According to still another aspect of the present invention, there is provided a storage device readable by a computer which stores a program for giving a player an instruction to operate at least one operation member provided in a game system at a predetermined timing in association with progress of a play of a predetermined musical composition, said instruction is given through a screen of a display device provided in the game system, and said program is prepared for causing the computer to execute steps of:

displaying an indicator on the screen of the display device, said indicator being provided with at least one track extending in a predetermined direction; and indicating index marks, each of which is provided for indicating operation timing of the operation member, in such a manner that each of the index marks moves along the track and then reaches to a fixed operation position defined in the track when the operation timing associated with each of the index marks comes.

In the present invention, the storage device may include a magnetic storage device such as a hard disk drive or a floppy disk, an optical or a magneto-optical storage device such as a CD-ROM, a semiconductor storage device such as a RAM or a ROM, or the other various types of the storage devices. The performance operation includes an action to complete the music by playing one part of the music by the player as well as an action to remix sounds of a complete music composition with an effect of sound or light.

Still further objects, features and other aspect of the present invention will be understood from the following detailed description of the preferred embodiments of the present invention with reference to the accompanying drawings.

BREIF DESCRIPTION OF THE DRAWINGS

FIG. 5A is a plan view of a slit disk connected with a lower end of a rotary shaft and FIG. 5B is an enlarged view of a portion Vb in FIG. 5A;

FIG. 8 is a view showing an indication table for defining a relationship between operation members and a sound effect of the game machine of FIG. 1 for each phrase of the musical composition to be played;

FIG. 18 is a diagram illustrating display examples of the indicator in a normal mode and an easy mode for reducing operational difficulty;

FIG. 19 is a diagram illustrating display examples of the indicator in a random and a non-random mode;

DETAILED DESCRIPTION OF THE PREFERRED EMBODIMENTS

The preferred embodiment of the present invention will now be explained below with reference to the attached drawings.

Figure 1:
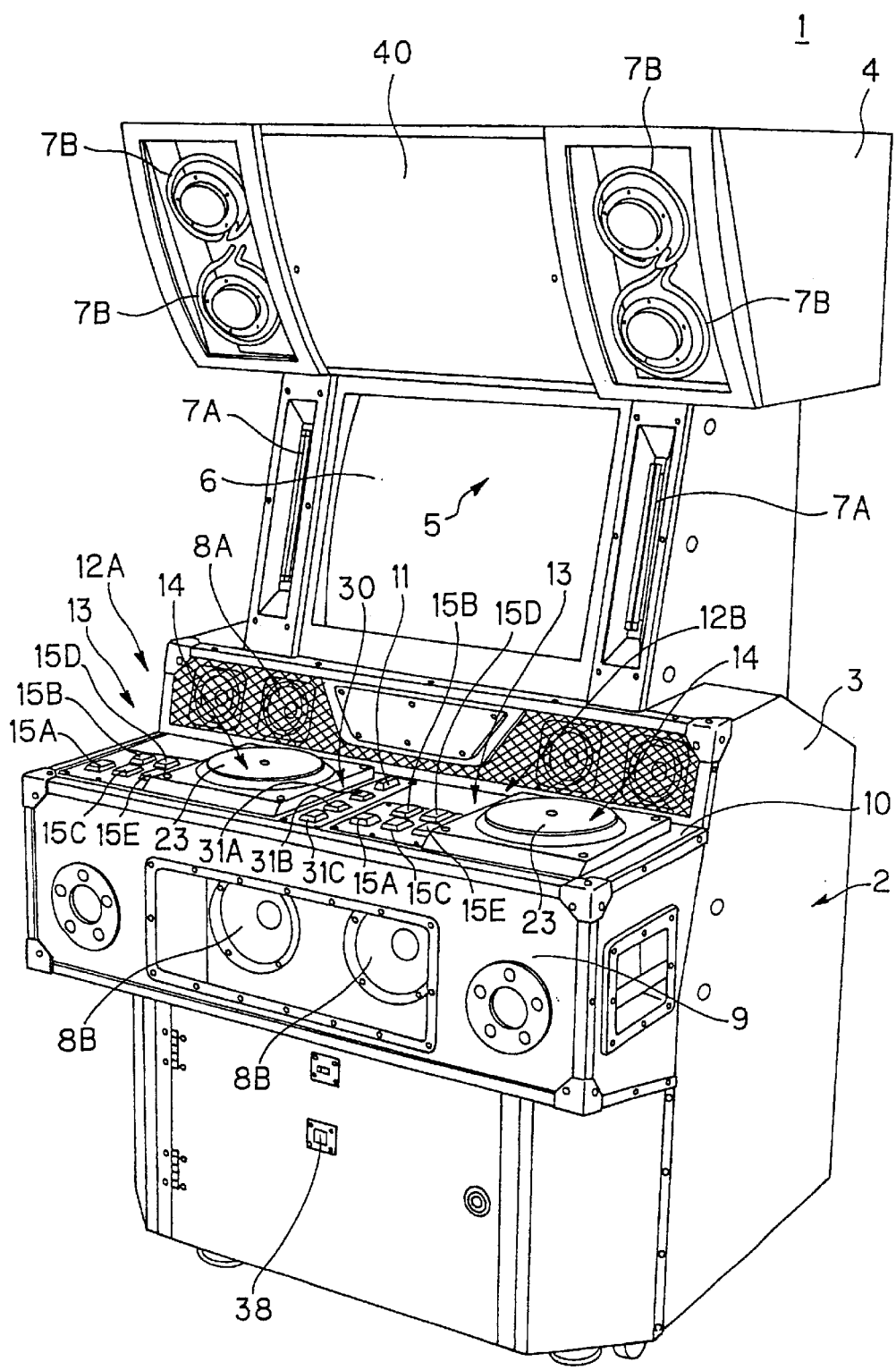
FIG. 1 is a perspective view of a music action game machine in accordance with one embodiment of the present invention.
Figure 2:
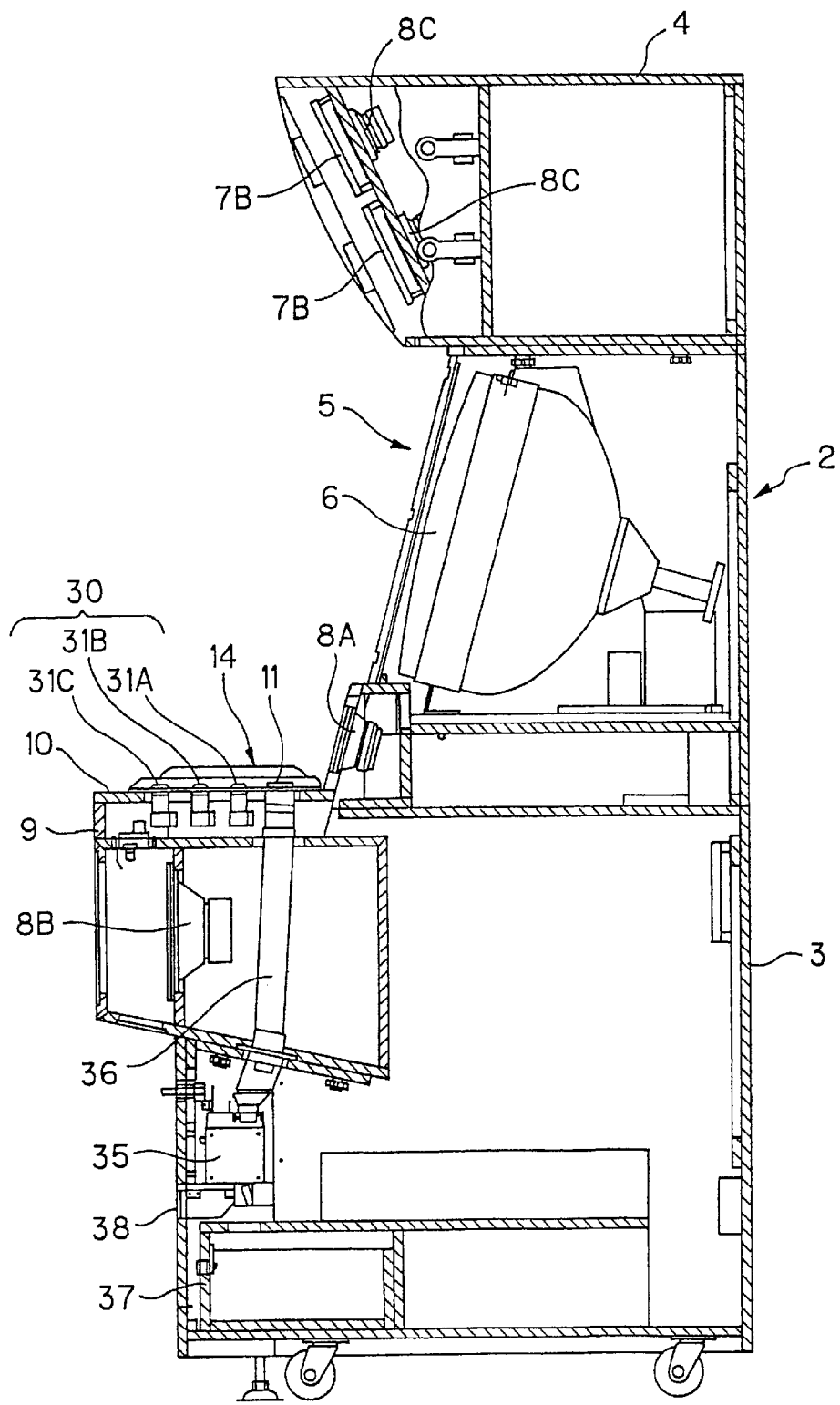
FIG. 2 is a vertical sectional view of the game machine of FIG. 1, which is taken along a front and rear side direction thereof.

FIG. 1 shows an appearance of a music action game machine according to the present invention and FIG. 2 shows an internal structure thereof. The game machine 1 is constructed by attaching various parts on or in the main body 2. The main body 2 is provided with a main housing 3 and a top box 4 mounted on the top of the main housing 3. At the upper portion of the main housing 3, there is provided a display portion 5. The display portion 5 is provided with a CRT monitor 6, and both sides of the monitor 6 are provided illumination lamps 7A, 7A so as to extend vertically. Below the display portion 5, there is provided loud speakers 8A . . . 8A. The main housing 3 is provided below the loud speakers 8A with a forward projecting portion 9, and the front side of the projecting portion 9 is provided with a loud speaker units 8B, 8B.

The projecting portion 9 is provided on the top thereof with a control panel 10. The control panel 10 is positioned in the vertical direction so as to be adjacent to hands of a player (or players) when the player stands in front of the game machine 1 with facing a screen of the monitor 6. The control panel 10 is provided with a coin insertion slot 11 located at the center thereof, a performance operating section 12A for the first player located at the left side of the coin insertion slot 11, and a performance operating section 12B for the second player located at the right side of the coin insertion slot 11. Each of the operating sections 12A and 12B is provided with an operation input device comprising a keyboard input unit 13 and a turntable input unit 14.

The keyboard input unit 13 is provided with five keys 15A, 15B, 15C, 15D, and 15E consisted of push button switches. The arrangement of the keys 15A to 15E is similar to the key arrangement of musical instruments. Namely, the three keys 15A, 15C and 15E are juxtaposed on a side near the player while the two keys 15B and 15D are juxtaposed behind thereof. Also, the rear side keys 15B and 15D are aligned with boundary positions between the front side keys 15A, 15C, and 15E. Hereinafter, each of the operating sections 12A and 12B will be denoted as the operating section 12, if it is not necessary to distinguish the two sections 12A and 12B from each other, and each of the keys 15A to 15E may be denoted as the key 15.

Figure 3:
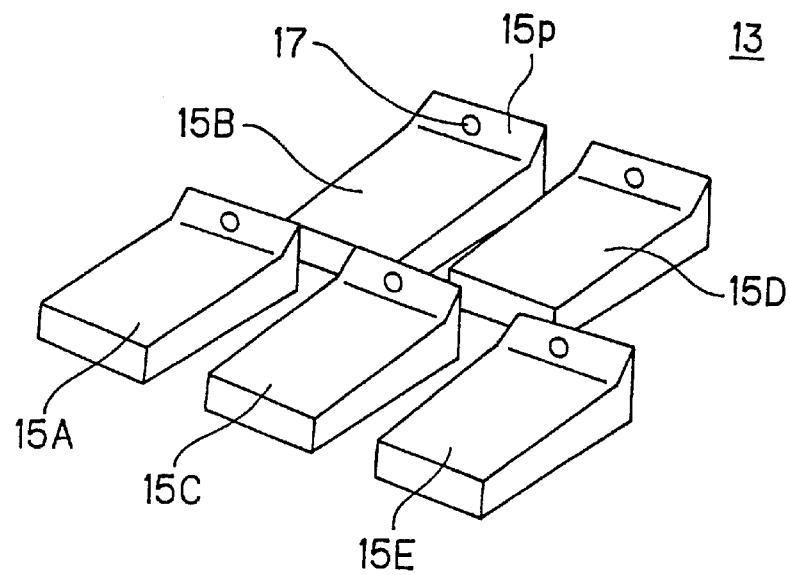
FIG. 3 is an enlarged view showing a keyboard input unit provided in the game machine of FIG. 1.

In FIG. 1, the top of each key 15 is illustrated as a flat plane, however, as shown in FIG. 3, each key 15 may be provided with a projecting portion 15p on one side far from the player. Each key 15 is provided with an indicating lamp 17 such as an LED. Instead of the indicating lamp 17, an illuminant such as an electric bulb or the like may be provided inside the key 15 to emit light from the key 15 itself.

Figure 4:
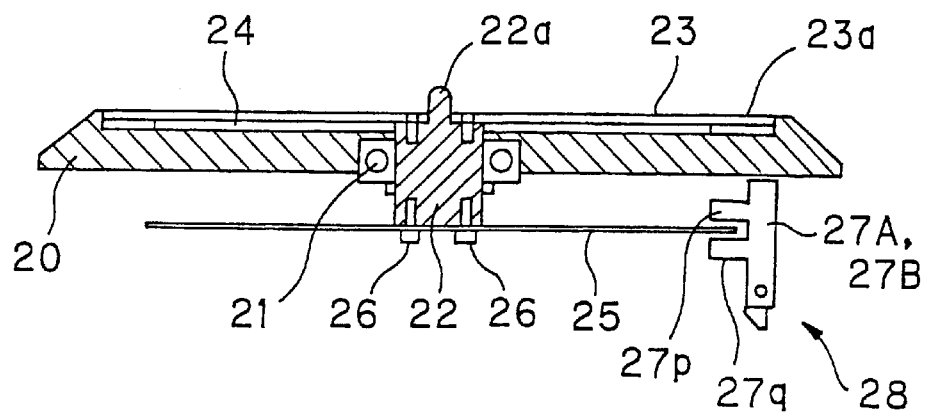
FIG. 4 is a sectional view of a turntable input unit provided in the game machine of FIG. 1.

FIG. 4 shows a detail of the turntable input unit 14. The turntable input unit 14 comprises a base 20. mounted on the control panel 10, a rotary shaft 22 supported on the base 20 through a bearing 21 so as to rotate about an axis thereof, and a slide disk 23 as a disk-shaped operation member fitted into a circular recess 20a of the base 20 and connected with the upper end 22a of the rotary shaft 22 so as to be rotatable therewith. The slide disk 23 is in imitation of a phonograph record disk, and the upper surface 23a is exposed outside of the control panel 10. The player can enjoy a simulation of scratch play by turning the slide disk 23 in a clockwise or counter-clockwise direction with putting fingers on the upper surface 23a. The scratch play is known as an action to produce various scratch sounds by manually and irregularly turning the phonograph record disk with keeping the contact between the record disk and a stylus of a phonograph player.

Between the slide disk 23 and the bottom surface of the circular recess 20a of the base 20, there is provided with a felt sheet 24 as means for giving friction resistance against the turning movement of the slide disk 23. The felt sheet 24 is formed in a disk-shape and is smaller than the slide disk 23. The felt sheet 24 may have at least one through hole to maintain the friction resistance in a proper degree.

Figure 5A:
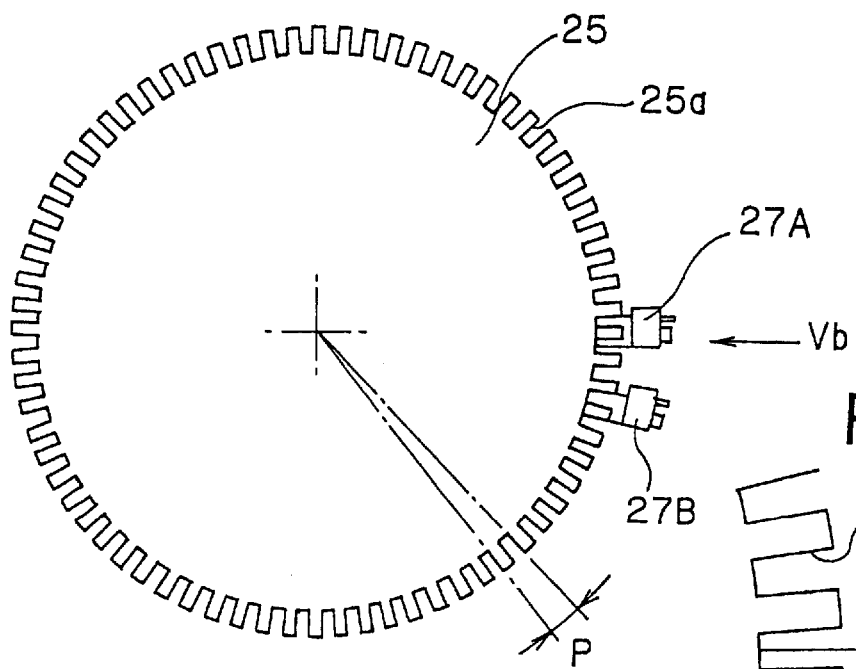
FIGS. 5A and 5B are views showing details of a detection mechanism provided in the turntable input unit of FIG. 4; namely.

The turntable input unit 14 is provided with a detection mechanism 28 for detecting information with respect to an operation of the slide disk 23, such as a turning speed, a turning direction or the like. The detection mechanism 28 comprises a slit disk 25 fixed to the lower end of the rotary shaft 22 by using screws 26 . . . 26 so as to be rotatable therewith, and a pair of sensors 27A and 27B provided on an outer periphery of the slit disk 25. As shown in FIG. 5A, on the outer periphery of the slit disk 25, there are provided a plurality of slits 25a . . . 25a with leaving a certain pitch angle P therebetween in a circumferential direction of the slit disk 25.

Figure 5B:
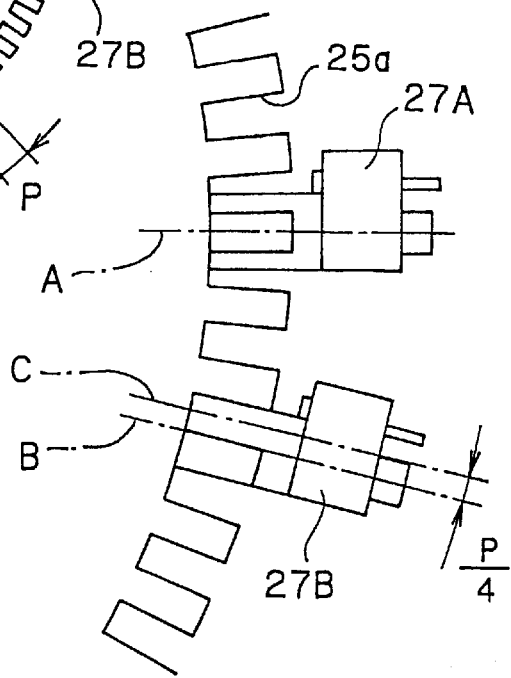

Each of the sensors 27A and 27B is a photo-interrupt-type sensor in which a predetermined beam of light is emitted from an emitter 27p toward a receiver 27q and the receiver 27q issues a predetermined signal which changes between ON and OFF in accordance with the intensity of the light received therein. As shown in FIG. 5B, the sensors 27A and 27B are arranged in such a manner that when a center line A of the sensor 27A is positioned in the middle of the two slits 25a, 25a which are adjacent to each other, a center line B of the other sensor 27B is deviated from a center line C of the nearest slit 25a by P/4 i.e. one-fourth of the pitch angle P in the circumferential direction. The deviation between the center lines B and C is not limited to P/4; namely, the deviation may be set to various values except P/2.

In the above-mentioned turntable input unit 14, when the slide disk 23 is turned, the slit disk 25 also turns therewith, and the signals issued from the sensors 27A and 27B cyclically change in a predetermined cycle depending on the turning speed of the slit disk 25. Therefore, it is possible to calculate the turning speed of the slide disk 23 by detecting the cycle of the signals. Also, it is possible to distinguish the turning direction of the slide disk 23 on the basis of a phase difference between the signals issued from the sensors 27A and 27B, in other words, the degree of deviation between the timing at which the signals changes between ON and OFF.

As shown in FIGS. 1 and 2, the control panel 10 is provided at the center thereof with a supplemental input device 30. The supplemental input device 30 comprises three push button switches 31A, 31B and 31C disposed in front of the coin insertion slot 11 so as to be aligned in the front-and-rear side direction. Also, as shown in FIG. 2, the main body 2 is provided therein with a coin control device 35. A coin inserted into the slot 11 falls into the control device 35 through a chute 36. The control device 35 examines whether the inserted coin is acceptable or not, and feeds the coin which is judged to be acceptable to a stock container 37 while feeding the coin which is judged not to be acceptable to a coin return port 38 (refer to FIG. 1).

As shown in FIG. 1, the top box 4 of the main body 2 is provided at the center on the front side thereof with a decoration panel 40, and both sides thereof are provided loud speakers 8C . . . 8C. Each loud speaker 8C is installed in a downward oblique manner that the top side thereof is located forward from the lower side thereof to emphasize existence thereof to the player. On the periphery of each loud speaker 8C, there is provided a illumination lamp 7B of a tube-type which is circularly curved so as to surround the loud speaker 8C.

Figure 6:
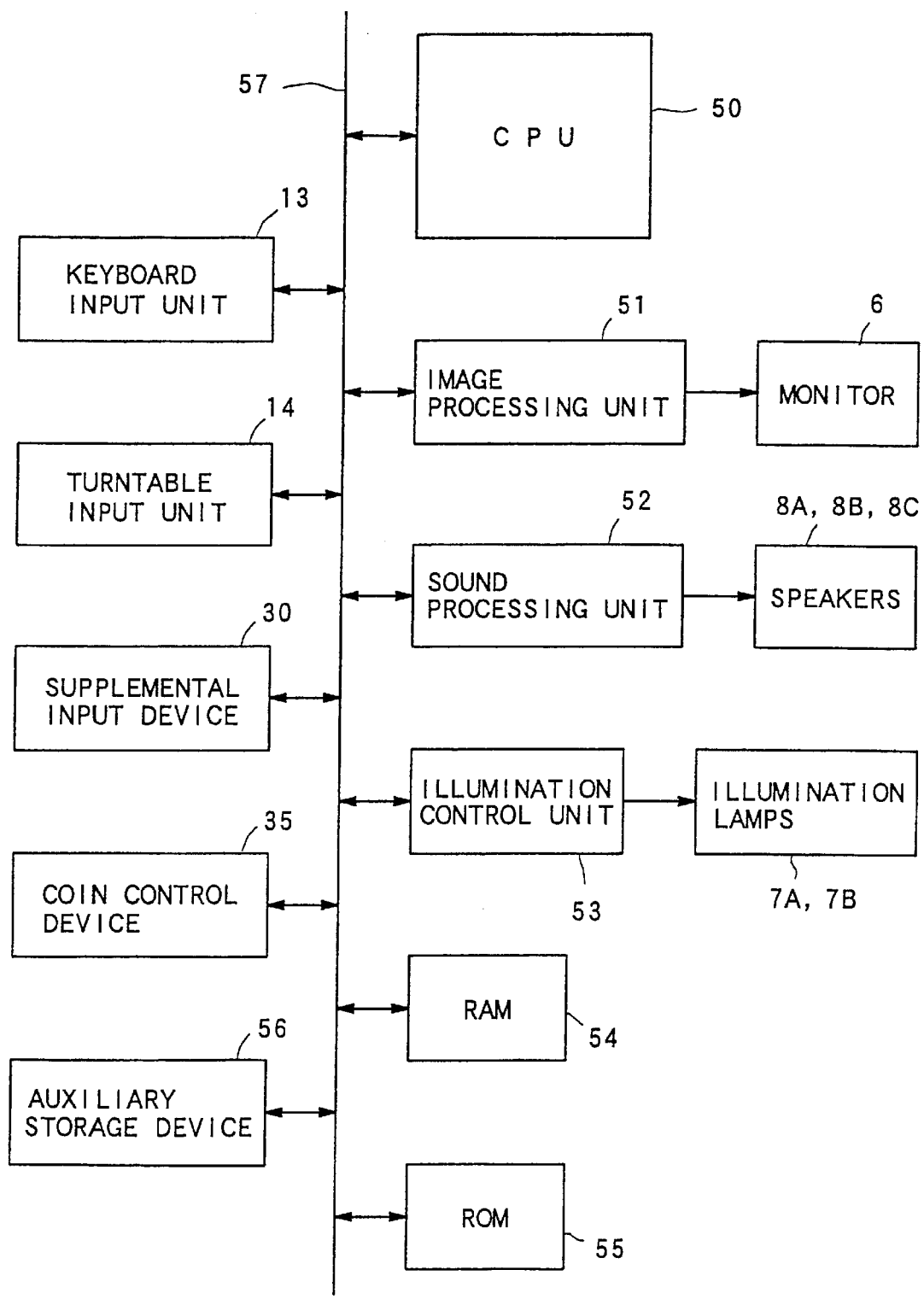
FIG. 6 is a block diagram showing a control system of the game machine of FIG. 1.

FIG. 6 shows a structure of a control system provided in the game machine 1. As is apparent from FIG. 6, the game machine 1 comprises a CPU 50 mainly consisted of a microprocessor to perform various calculations and operation controls necessary for progress of the game, an image processing unit 51 for displaying desirable images on the screen of the monitor 6 in accordance with requests from the CPU 50, a sound processing unit 52 for producing sounds through the loud speakers 8A, 8B and 8C in accordance with requests from the CPU 50, an illumination control unit 53 for turning the illumination lamps 7A and 7B ON and OFF in accordance with requests from the CPU 50, and a storage means consisted of a RAM 54, a ROM 55 and an auxiliary storage device 56. The auxiliary storage device 56 is preferably a hard disk drive with a magnetic storage media having a capacity far greater than that of each of the RAM 54 and the ROM 55. The sound processing unit 52 is capable of receiving PCM (Pulse Code Modulation) or ADPCM (Adaptive Differential Pulse Code Modulation) data stored in the auxiliary storage device 56 in response to requests from the CPU 50 and producing sounds through the loud speakers 8A, 8B and 8C in association with the data.

Each of the above mentioned units 51 to 53, the RAM 54, the ROM 55 and the auxiliary storage device 56 is electrically connected with the CPU 50 through a bus 57. Also, the CPU 50 is electrically connected with the keyboard input unit 13, the turntable input unit 14, the supplemental input device 30 and the coin control device 35 through the bus 57.

The ROM 55 stores a program and data necessary for controlling a basic operation of the game machine 1 during the start-up thereof or the like. The auxiliary storage device 56 stores music data for reproducing various musical compositions as BGM (Back Ground Music), and performance data for defining a procedure of an performance operation to be performed with respect to each musical composition. These data are loaded into a predetermined area in the RAM 54 in accordance with requests from the CPU 50. The music data is formed, for example, as PCM data or ADPCM data.

Figure 7:
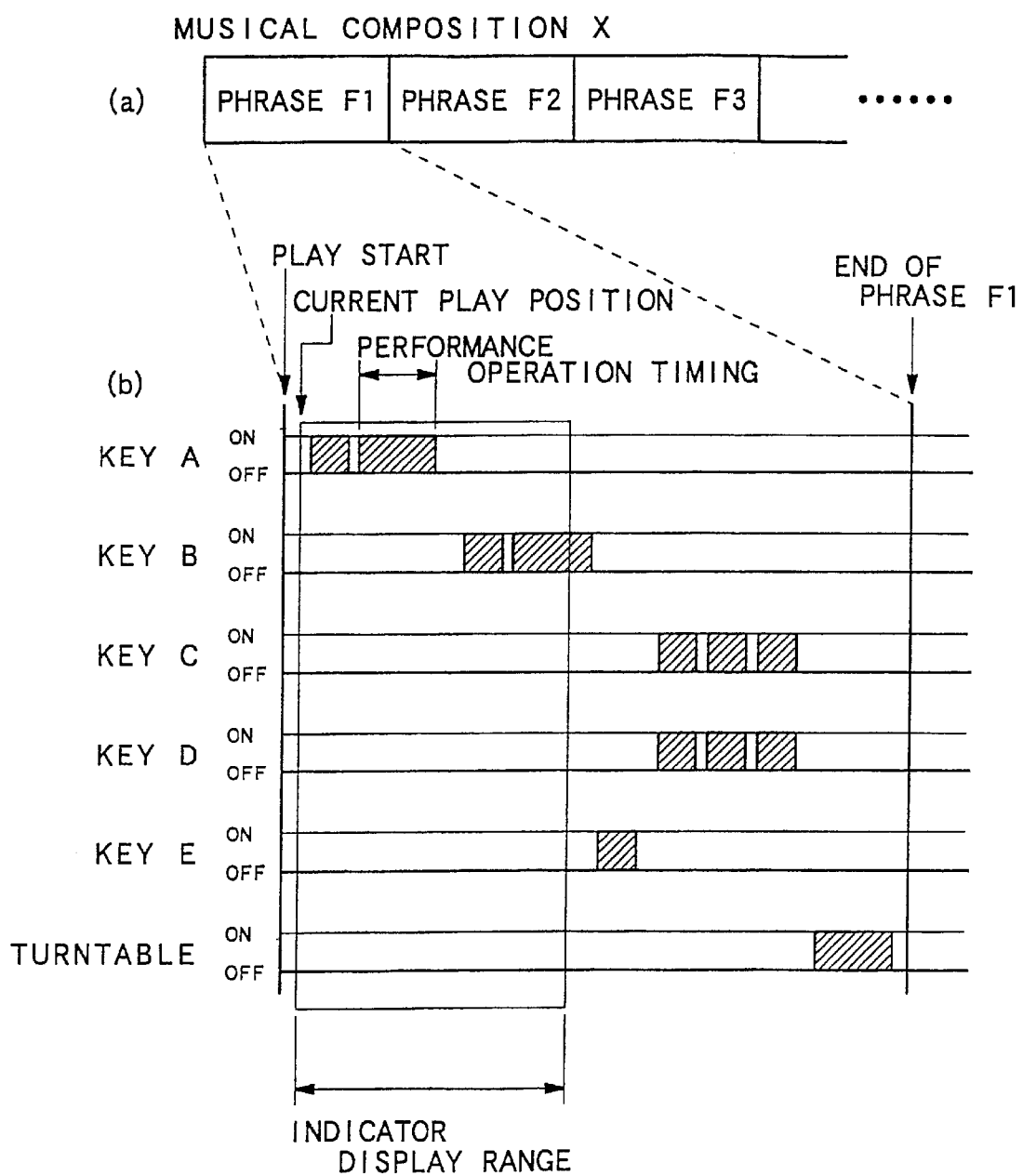
FIG. 7 is a view showing a relationship between music performance data and a performance procedure corresponding thereto.

FIGS. 7 and 8 show an example of a relationship between the music data stored in the auxiliary storage device 56 and a performance procedure corresponding thereto. In these figures, the operation members are represented as keys A to E, a turntable and adlib keys A to C. The keys A to E correspond to the keys 15A to 15E in FIG. 1, respectively. A turntable corresponds to the slide disk 23 in FIG. 1. Further, adlib keys A, B and C in FIG. 8 correspond to the push button switches 31A to 31C in the supplemental input device 30, respectively.

As shown in a block diagram of FIG. 7, the musical composition X comprises a plurality of phrases F1, F2, F3, . . . . The performance procedure with respect to the composition X, for example in the phrase F1, is prepared as illustrated in a time chart of FIG. 7. In the time chart, each rectangular portion, i.e. hatched portion represents a time period during which each operation member is to be operated, the left end of the rectangular portion represents a start time of the operation, the right side thereof represents an end time of the operation, and a length of the rectangular portion corresponds to a length of time during which the operation must be continued. The auxiliary storage device 56 stores numerical data of the start time and the end time for each of the keys A to E and the turntable coded in accordance with the time chart in FIG. 7.

The storage device 56 also stores data of various sound effects to be produced through the loud speakers in response to the operation to each of the keys A to E and the adlib keys A to C. In order to change the sound effects every phrase of the musical composition, the storage device 56 stores a data table TB (illustrated in FIG. 8) in association with the music data. In the data table TB, the sound effect to be produced in each of the phrases F1, F2, F3 . . . is assigned to each of the keys A to E and the adlib keys A to C. For example in the phrase F1, the sound effects 1 to 5 are assigned to the keys A to E and the sound effects 6 to 8 are assigned to the adlib keys A to C, respectively. As mentioned above, the data for producing the sound effects 1, 2, . . . are also stored in the storage device 56. Note that, it is possible to use various sounds considered to be proper for performing the music, such as sounds of musical instruments, sounds of voice, sounds of handclaps or the like. The data of sound effects may be formed as PCM or ADPCM data.

Since the turntable input device 14 is provided to give the player with the pleasure of the simulation of the scratch play, it is preferable to assign a scratch sound effect to the operation of the slide disk 23. The scratch sound effect should be tuned so as to be similar to the real scratch sound which is produced by performing the scratch play with using the real phonograph record disk and the phonograph player. It is also preferable to change the scratch sound effect in accordance with the turning direction of the slide disk 23 or the rotation speed of the slide disk 23.

Since the two operating sections 12A and 12B are provided in the game machine 1, two sets of the performance data are prepared for the operating sections 12A and 12B and stored into the storage device 56. If the two sets of the performance data are different from each other, it is possible to provide the player (or players) with a game play like a musical dialogue or duet, and to produce different sound effects in response to the performance operations to each operating section 12. Therefore, it is possible for the player (or players) to play various performances in contrast with the case in which only one of the operating sections 12 is used, thereby increasing interest of the game.

Figure 9:
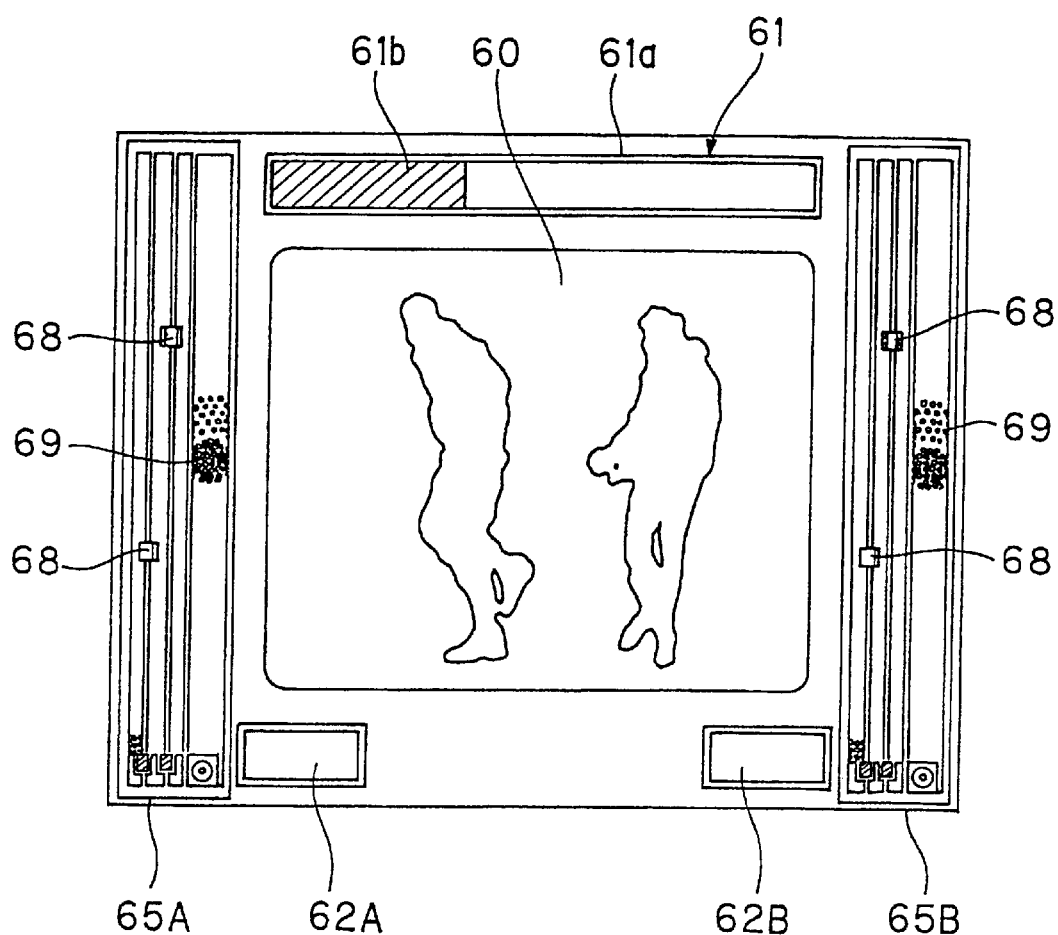
FIG. 9 is a diagram illustrating an example of a game image displayed on a screen of the game machine during game play.

FIG. 9 shows a game image displayed on the screen of the monitor 6 through the image processing device 51 during the game play. The game image comprises a main display portion 60 disposed at a center thereof, a groove gauge 61 disposed above the main display portion 60, and a pair of score frames 62A and 62B disposed below the main display portion 60. The main display portion 60 is a portion in which a video image or the like is displayed to heat up the atmosphere of the game. For example, dance scenes matching the music played through the game machine 1 are displayed.

The groove gauge 61 is provided with a gauge frame 61a and a gauge bar 61b capable of expanding and contracting in accordance with superiority of the game play with the left end of the frame 61b being as a reference. Note that, the gauge bar 61b is illustrated with hatching in FIG. 9. The score frame 62A is provided for displaying therein a game score corresponding to the performance operation to the performance operating section 12A, while the score frame 62B is provided for displaying therein a game score corresponding to the performance operation to the performance operating section 12B.

The game image is also provided at the left and right side thereof with indicators 65A and 65B. Each of the indicators 65A and 65B has the same configuration. Hereinafter, each indicator may be denoted as the indicator 65 if it is not necessary to distinguish the indicators 65A and 65B from each other. The indicator 65 is provided with five rows of key tracks 66A, 66B, 66C, 66D and 66E each extending in the vertical direction, and a turntable track 67. The key tracks 66A to 66E are provided for indicating operation timing of keys 15A to 15E, respectively, and the turntable track 67 is provided for indicating operation timing of the slide disk 23.

In the key tracks 66A to 66E, there are displayed index marks 68 . . . 68 corresponding to the keys 15A to 15E, and in the turntable track 67 are displayed an index mark 69 corresponding to the slide disk 23. These marks 68, 69 are displayed so as to move downward along the key tracks 66A to 66E or the turntable track 69 in accordance with the progress of the play of the music as indicated by an arrow V (refer to imaginary lines illustrated in the track 66B).

When each of the marks 68, 69 reaches to a performance operation position PP defined at the lower end of the tracks 66A to 66E and 67, the operation timing of each of the keys 15A to 15E and the slide disk 23 associated with each track comes. At the lower ends of the tracks 66A to 66E and 67, there are displayed key type icons 70A to 70E, which represent the keys 15A to 15E respectively, and turntable type icon 71 representing the slide disk 23 so as to be adjacent to the performance operation position PP.

Figure 10:
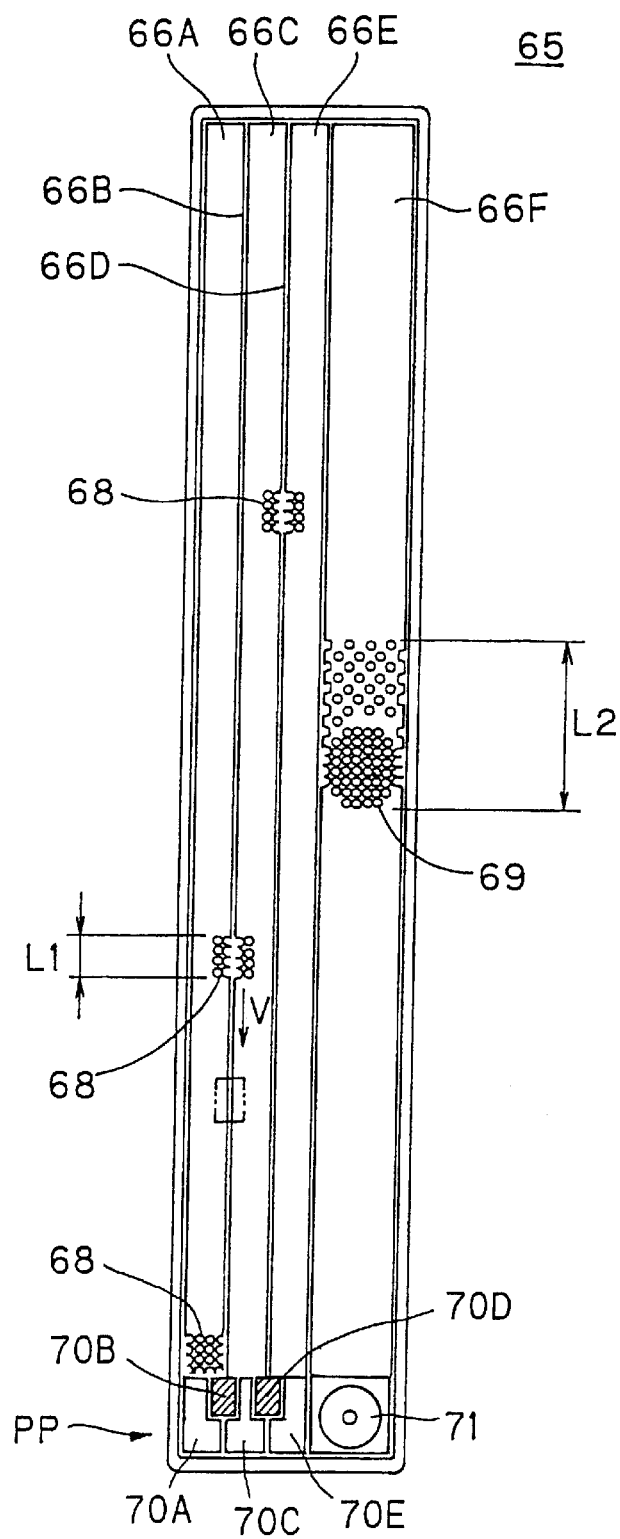
FIG. 10 is a diagram illustrating an indicator displayed in the game image of FIG. 9 for indicating timing of performance operation to the player.

In FIG. 10, the mark 68 displayed in the left end track 66A has just reached to the performance operation position PP, so that the player is indicated to operate the key 15A from this moment until the mark 68 will disappear below the track 66A. Each of the lengths L1 and L2 of the marks 68 and 69 is changed in accordance with a length of an operation continuation time of the key 15 or the slide disk 23, in other words a time period during which the player must continuously operate the key 15 or the slide disk 23, to thereby indicate the player to the operation continuation time as well as the start time of the performance operation.

The above-mentioned display of the marks 68 and 69 may be carried out, for example by the steps of: setting indicator display range which corresponds to the length of the tracks 66A to 66E and 67 on the time chart of FIG. 7; moving the indicator display range toward the right side in FIG. 7; and repeating renewal of the display of the indicator 65 with considering a relationship between the time chart in FIG. 7 and the display of the indicator 65 such that the left and right ends of the indicator display range corresponds to the lower and upper end of the tracks 66A to 66E and 67, respectively, and the rectangular portions in the time chart correspond to marks 68 and 69.

In the present invention, the indication of the operation continuation time depending on the length of the mark 68 or 69 may be omitted; namely, each mark may be displayed with a fixed length to thereby indicate only the operation timing. Also, the indication of the indicator 65 may change in such a manner that the length of each index mark represents a time period during which the player must hit the key 15 repeatedly.

In the above-mentioned game machine 1, when acceptable coins of predetermined numbers are inserted into the coin insertion slot 11, the coin control device 35 issues a game start signal to the CPU 50, and the CPU 50 starts a predetermined game process in response to the signal. If the amount of the inserted coins are enough for two players, a selection image which prompts the player to select either one of the single player mode or two players mode is displayed on the screen of the monitor 6, and the CPU 50 determines which one is selected in accordance with a selection operation of the player. The selection operation may be done by using the supplement input device 30. The single player mode is a mode in which the game is played with using only one combination of the indicator 65 and the operating section 12, and the two players mode is a mode in which the game is played with using two combinations of the indicator 65 and the operating section 12. Hereinafter, the single player mode will be represented as 1P mode, and the two players mode will be represented as 2P mode.

Figure 11:
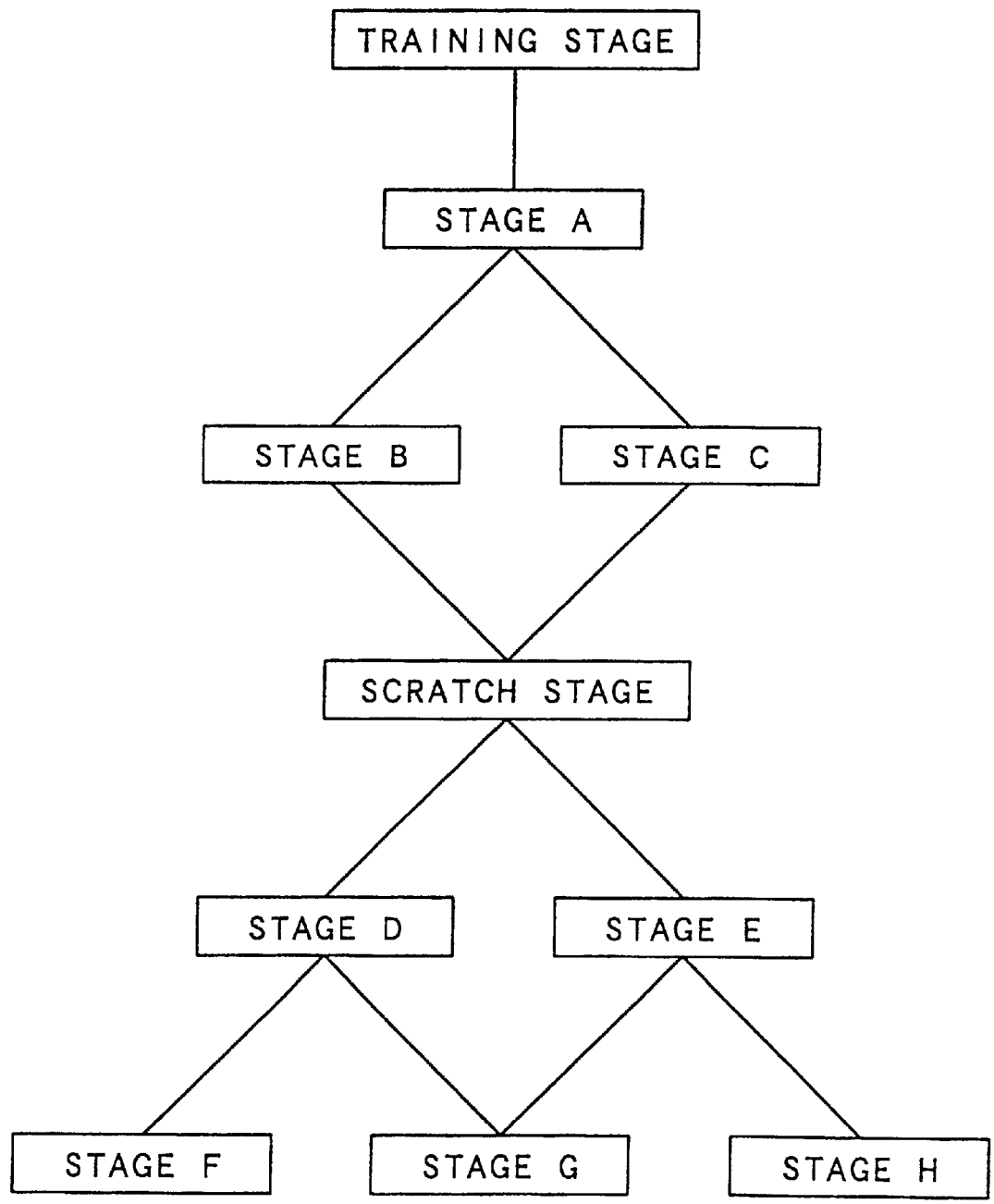
FIG. 11 is a flow diagram showing an example of a stage arrangement in the game machine of FIG. 1.

In the game machine 1, the entire game is divided into a plurality of stages and the game play is advanced stepwise with one stage being as a unit. FIG. 11 shows one example of a combination of the stages. In this example, the game is advanced stepwise in six steps, that is, a training stage, one of stages A, B and C, a scratch stage, one of stages D and E, and one of stages F, G and H. Each stage features music, the genre of which is different from that of the other stage. For example, the stage A features TECHNO music, and the stage B features EURO BEAT music. The scratch stage is a special stage in which only the turntable input unit 14 is used for the performance operation. The combination of the stages may be changed. For example, the training stage may be omitted by a cancel operation.

Figure 12:
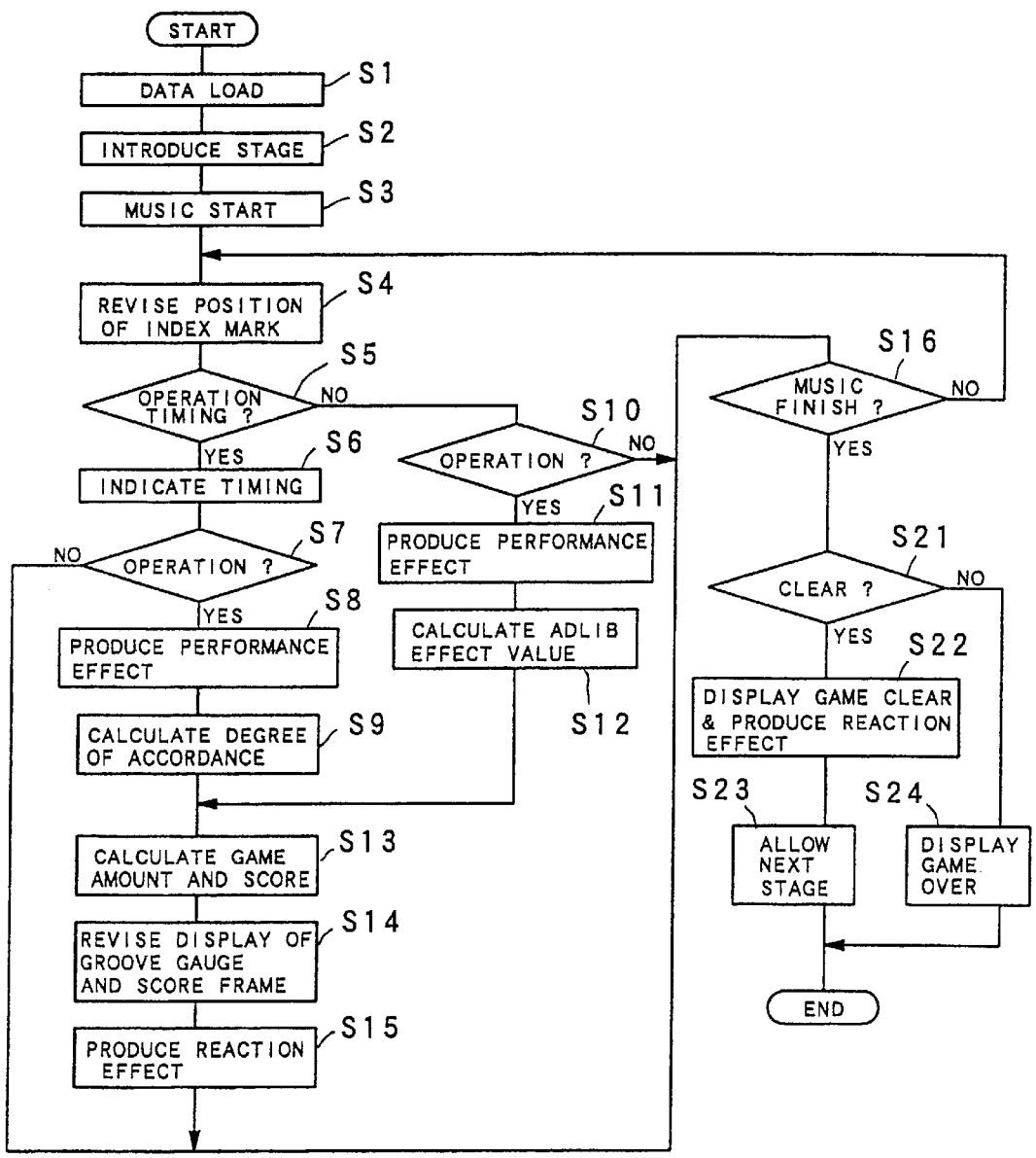
FIG. 12 is a flow chart showing a process for one stage executed by a CPU of FIG. 6.

FIG. 12 is a flow chart showing a procedure for one stage executed by the CPU 50. In this procedure, at least part of the music data and the performance data, each of which corresponds to the present stage, are loaded from the storage device 56 to the RAM 54 (step S1), and the contents of the stage are introduced to the player on the basis of the loaded data (step S2). For example, the genre of the music and the title thereof are displayed on the screen of the monitor 6, and a characteristic phrase of the music to be played in the current stage is played through the loud speakers 8A to 8C to thereby allow the player to understand the contents of the stage.

After introducing the stage, a predetermined start sign is given to the player through an image or sounds, and then the CPU 50 requests the sound processing unit 52 to start the play of the musical composition on the basis of the music data currently stored in the RAM 54 or the storage device 56 (step S3). As a result, the play of the predetermined music is started. After starting the play, positions of the index marks 68 and 69 in the indicator 65 are revised on the basis of a current play position of the music (step S4). This revision is cyclically repeated to move the marks 68 and 69 downward in the indicator 65 in accordance with the progress of the play of the music.

Next, the CPU 50 determines whether the operation timing of any one of the keys 15 and the slide disk 23 comes or not on the basis of the current play position of the music (refer to FIG. 7) and the performance data (step S5), and gives the player an indication of the operation timing, if the operation timing comes (step S6). The indication is carried out by changing the color of the mark 68 or 69 which has reached to the performance operation position PP in the indicator 65. If the operation timing of any one of the keys 15A to 15E comes, the indicating lamp 17 of the key 15 to be operated is turned on or blinked to show the player which key 15 should be operated.

After the timing indication, the CPU 50 judges whether any one of the keys 15A to 15E, the slide disk 23 and the push button switches 31A to 31C is operated or not (step S7). If judged that the operation is performed, the CPU 50 produces the performance effect corresponding to the operation (step S8). The performance effect may be producing a sound effect through the loud speakers 8A to 8C and blinking the illumination lamps 7A and 7B in association with the operation. The sound effect corresponding to each of the keys 15A to 15E and the push button switches 31A to 31C is determined as illustrated in FIG. 8, and the sound effect corresponding to the operation of the slide disk 23 is the above-mentioned scratch sound effect.

After producing the performance effect, the CPU 50 detects difference between the actual operation performed by the player and the operation defined by the performance data, especially with respect to the operation start time and the operation continuation time, and calculates a degree of accordance therebetween with using predetermined formulas to thereby estimate the operation of the player (step S9). The formulas are defined to decrease the degree of the accordance as the difference in the operation start time or continuation time increasing. If the operated key 15 or the slide disk 23 is different from the operation member designated by the indicator 65 to be operated, the degree of the accordance is not calculated, or the degree is calculated as a negative value.

If it is judged at the step S5 that the operation timing does not come, the CPU 50 omits the above-mentioned indication of the operation timing at the step S6, and judges whether any one of the keys 15A to 15E, the slide disk 23 and the push button switches 31A to 31C is operated or not (step S10). If judged that the operation is performed, the CPU 50 produces the performance effect corresponding to the operation (step S11). At this time, the performance effect may also be producing a sound effect through the loud speakers 8A to 8C, and blinking the illumination lamps 7A and 7B in association with the operation.

The sound effect produced at the step S11 is based on an adlib operation rather than an operation corresponding to the indication of the indicator 65. Therefore, it is not appropriate to estimate such an adlib operation on the basis of the degree of the accordance applied at the step S9. Accordingly, an adlib effect value is calculated at the step S12 to estimate the adlib operation by using formulas different from the formulas used at the step S9. The formulas used at the step S12 are adjusted to make a score higher as the adlib operation being judged as more timely and appropriate in view of current states of the music and the performance thereto. If the game is in the 2P mode, the degree of the accordance and the adlib effect value are calculated separately for each operation section 12. The calculation of the adlib effect value at the step S12 may be omitted; namely, the process may jump to the step S16 after producing the performance effect at the step S11.

After the calculation at the step S9 or S12, the CPU 50 calculates an amount of the groove gauge 61, that is, the length of the bar 61b and scores to be displayed in the score frames 62A and 62B on the basis of the result of the above-mentioned calculation (step S13). The amount of the gauge is calculated so as to change in accordance with the superiority of the performance operation performed by the payer. For example, if the degree of the accordance or the adlib effect value exceeds to a predetermined reference level, the gauge amount increases in accordance with a margin from the reference level, while the gauge amount decreases in accordance with the margin if the degree of the value is under the reference level. Even if the 2P mode, the gauge bar 61b displayed in the groove gauge 61 is single, so that the gauge amount is calculated as a single value on the basis of each calculated result of the degree of the accordance and the adlib effect value for each operating section 12. On the other hand, the scores displayed in the score frames 62A and 62B are calculated separately for each operating section 12 by aggregating the degrees of the amount and the adlib effect values separately for each operating section 12. Therefore, if the two players simultaneously play the game, it is possible for the players to compete with each other for the high score.

After the calculation of the gauge amount and the scores, the CPU 50 revises display states of the groove gauge 61 and the score frames 62A and 62B in cooperation with the image processing unit 51, and then produces a reaction effect on the basis of the degree of the association or the adlib effect values calculated at the step S9 or S12. The reaction effect is aimed to give the player feeling of arranging the music as a DJ (Disc Jockey) in a discotheque or the like. Therefore, if the degree of the association or the adlib effect value is a high level, cheering sounds of the audience may be produced as the reaction effect, while booing sounds thereof may be produced if in the case of a low level. The illumination lamps may be used to enhance the reaction effect.

After producing the reaction effect at the step S15 or judging at the step S7 or S10 that the operation is not performed, the CPU 50 judges whether the play of the music finishes or not (step S16), and if the play does not finish, the process returns to the step S4. If the play of the music finishes, the CPU 50 judges whether or not the player clears the stage in comparison with a predetermined condition (step S21). For example, the CPU 50 judges whether the stage is cleared or not in association with a judgement as to whether or not the amount of the groove gauge 61 at the end of the stage exceeds a predetermined level.

If it is judged that the stage is cleared, the CPU 50 displays on the screen of the monitor 6 an image informing the player that the stage is cleared, and also produces a predetermined reaction effect (step S22). For example, great cheering sounds of audiences are produces as the reaction. At the next step S23, the CPU 50 allows the player to advance to the next stage, and then finishes the process for the current stage. On the other hand, if it is judged at the step S21 that the stage is not cleared, the CPU 50 displays an image representing that the game is over and then finishes the process for the current stage.

Next, another embodiment of the present invention will be explained with reference to FIGS. 13 to 19. In this embodiment, the procedure during the game is changed from that of the above-mentioned embodiment of FIGS. 1 to 12, so that the following description will mainly be concerned with the difference against the above-mentioned embodiment.

Figure 13A:
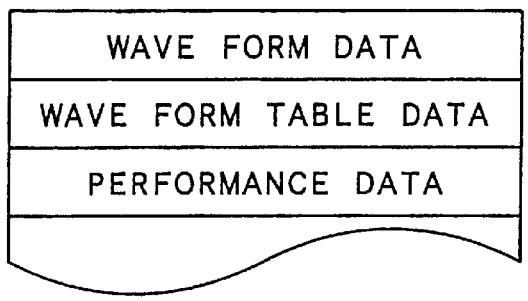
FIGS. 13A to 13C are diagrams showing a configuration of a data set for a musical composition X stored in an auxiliary storage device of FIG. 6 in accordance with another embodiment of the present invention.

In this embodiment, a plurality of musical compositions as the BGM to be used in the game are prepared similarly in the case of the above-mentioned embodiment. A data set illustrated in FIG. 13A is prepared for each musical composition and is stored in the auxiliary storage device 56. The data set for the musical composition X includes wave form data, wave form table data, and performance data.

Figure 13B:
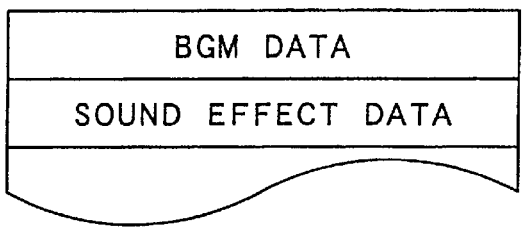

As shown in FIG. 13B, the wave form data includes BGM data and sound effect data. The BGM data contains data defining wave form for reproducing the musical composition X, and the sound effect data contains data defining wave form of sound to be produced in response to operations to the keys 15 and the slide disk of the turntable input device 14. These data are prepared and stored, for example, as PCM or ADPCM data. The reason why the sound effect data is included in the data set for each musical composition is to produce sound effects appropriately for each genre of the BGM.

Figure 13C:
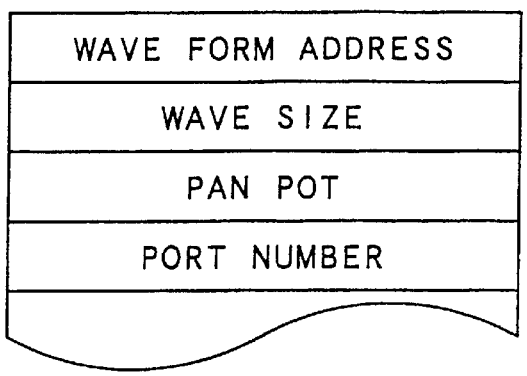

As shown in FIG. 13C, the wave form table data includes data tables for designating an address of the wave form data, a size of the wave form data, a pan pot (panning potentio meter), a port number and the like. The tables related to the address and the size contains information necessary for picking up the desirable BGM data and the sound effect data from the above-mentioned wave form data. The table for the pan pot contains information necessary for designating which channel, that is, the left or right channel of the loud speakers 8A to 8C must be used to produce the BGM sound or the sound effect. Note that both channels can simultaneously be used, if necessary. The table of the port number contains information necessary for designating the number of the port through which the BGM data and the sound effect data are issued. Namely, in this embodiment, the sound processing unit 52 comprises a plurality of channels, for example 8 channels, to produce sounds, and one of the channels is selected, as a channel through which the wave form data is reproduced, in accordance with the designation of the port number. The information for designating the port number is included in the table of the port number.

Figure 14:
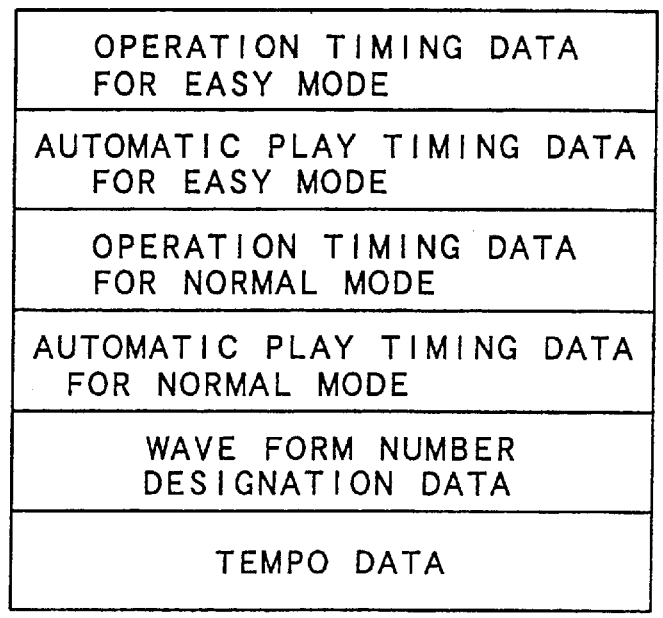
FIG. 14 is a diagram showing a configuration of the performance data of FIG. 13.

As shown in FIG. 14, the performance data contains operation timing data, automatic play timing data, wave form number designation data, and tempo data. The operation timing data and the automatic play timing data are prepared as two sets, one of which is for an easy mode and the other of which is for a normal mode. The detail of the difference between both modes will be explained later.

The operation timing data is data in which operation timing of the keys 15 and the slide disk 23 with respect to the musical composition X are designated in association with times which will be passed from a start of the musical composition X. In other words, the operation timing data defines one of the operation members, i.e., the keys 15 and the slide disk 23, which is to be operated at a specific time during the game. Therefore, the operation timing data corresponds to the data which is prepared by encoding the time chart illustrated in FIG. 7 in association with the time passed from the start of the music. As is explained in FIG. 7, the operation timing data is prepared separately for each of the keys A to E and the turntable. The operation timing data provides bases of the display of the indicator 65 and of the judgement on the operations of the keys 15 and the slide disk 23. Since the musical composition X comprises a plurality of phrases, information corresponding to times at which the phrases are changed are included in the operation timing data.

The automatic play timing data is provided for producing performance sound effects unless any of the keys 15 and the slide disk 23 is operated, and defines designation of the sound effect which is to be produced at the specific time in the game. During the game play, the CPU 50 issues commands to the sound processing unit 52 so as to produce the designated sound effect at the time designated by the automatic play timing data. The reason why the automatic play timing data is provided will be explained later.

The wave form number designation data is data for designating the sound effect to be produced in response to the operation of each of the keys 15 and the slide disk 23. The relationship between the operation of each key 15 and the sound effect to be produced in response to the operation may be fixed through the entire play of the musical composition X, or be changed every appropriate period, such as phrase shown in FIG. 8. In case that the sound effect is changed in the middle of playing the musical composition X, information for distinguish the relationship between the key 15 and the sound effect is recorded in the data in association with the time passed from the start of the music. The sound effect corresponding to the operation of the slide disk 23 may be the scratch sound effect or be another sound effect.

The tempo data is data for defining a tempo of the musical composition X. In case that the tempo is changed in the middle of playing the musical composition X, information for distinguish the tempo is recorded in the data in association with times passed from the start of the music. The game machine 1 controls the display range of the indicator 65 with reference to the tempo data.

Figure 15:
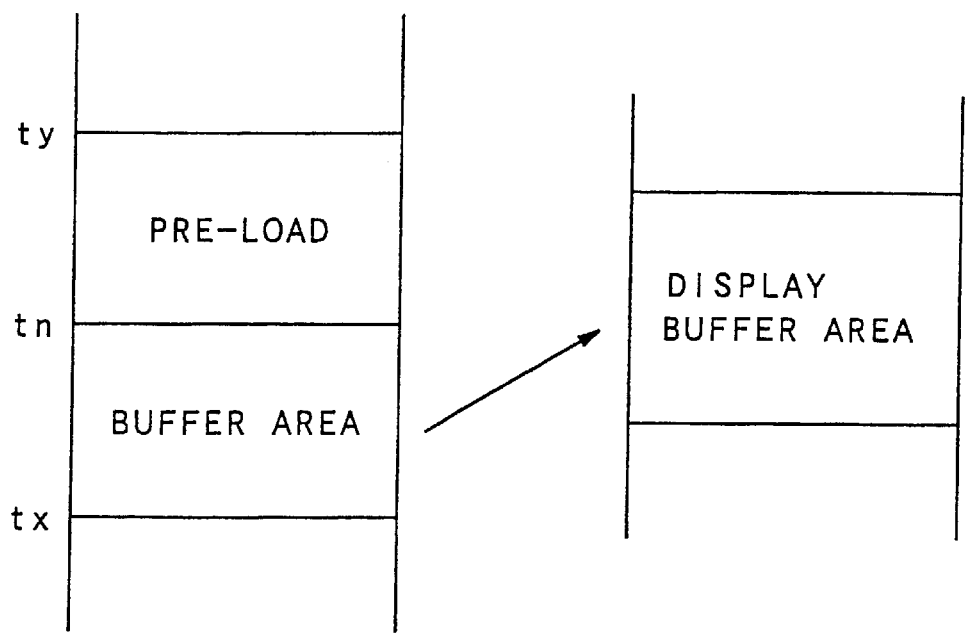
FIG. 15 is a diagram showing a manner for loading operation timing data into a RAM.

FIG. 15 shows a relationship between a read range of the operation timing data and a display range of the indicator 65. During the game play, the RAM 54 (refer to FIG. 6) provides a pre-load buffer area for the operation timing data, and a part of the operation timing data which corresponds to a time period from the current time tx to the time ty is loaded into the pre-load buffer area. Note that, the current time tx corresponds to a time which has currently passed from the start of the play of the music. Further, a part of the data which corresponds to a time period form the current time tx to the time tn (>ty) is loaded from the pre-load buffer area into a display buffer area in the RAM 54. The time period between the times tx and tn corresponds to two measures of the musical composition X, and the length of time thereof changes in accordance with the tempo of the play of the musical composition X. Accordingly, the CPU 50 determines the time tn, which is late from the current time tx by two measures, with reference to the tempo data, and then loads the operation timing data between the times tx and tn, as the data necessary for displaying the indicator 65, into the display buffer area. After this, the CPU 50 performs calculations necessary for determining an arrangement of the index marks 68 and 69 in the indicator 65 on the basis of the operation timing data loaded in the display buffer area, and then produces image data for displaying the indicator 65 on the basis of the result of the calculations. The image processing unit 51 revises the image of the indicator 65 on the basis of the produced image data to thereby display the indicator 65 appropriate for the current time tx. The time ty may also be changed in accordance with the tempo of the musical composition X. The data loaded into the display buffer area is not limited to that corresponding to the two measures.

Figure 16:
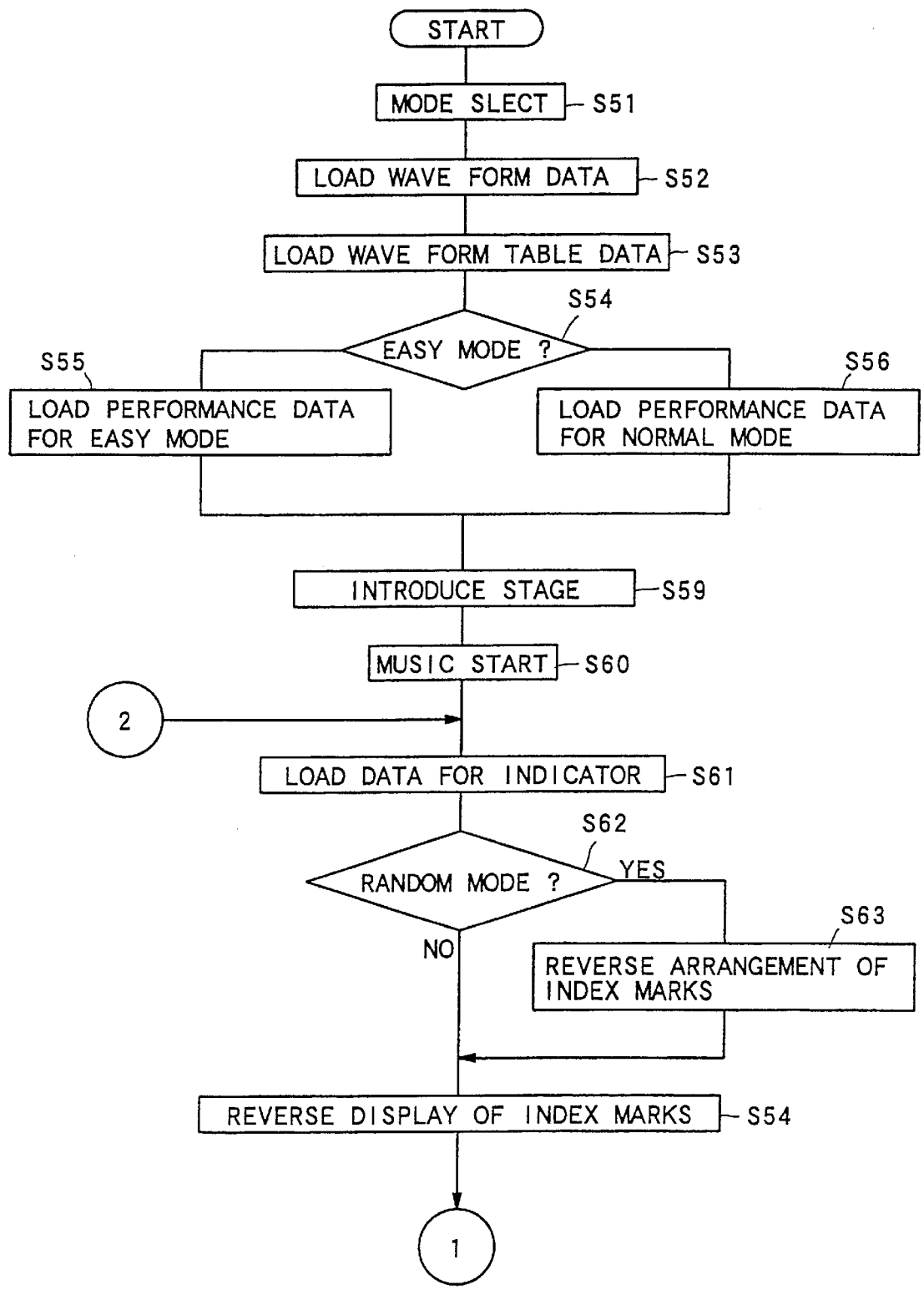
FIG. 16 is a flow chart showing a process for one stage executed by a CPU of FIG. 6 in the other embodiment.
Figure 17:
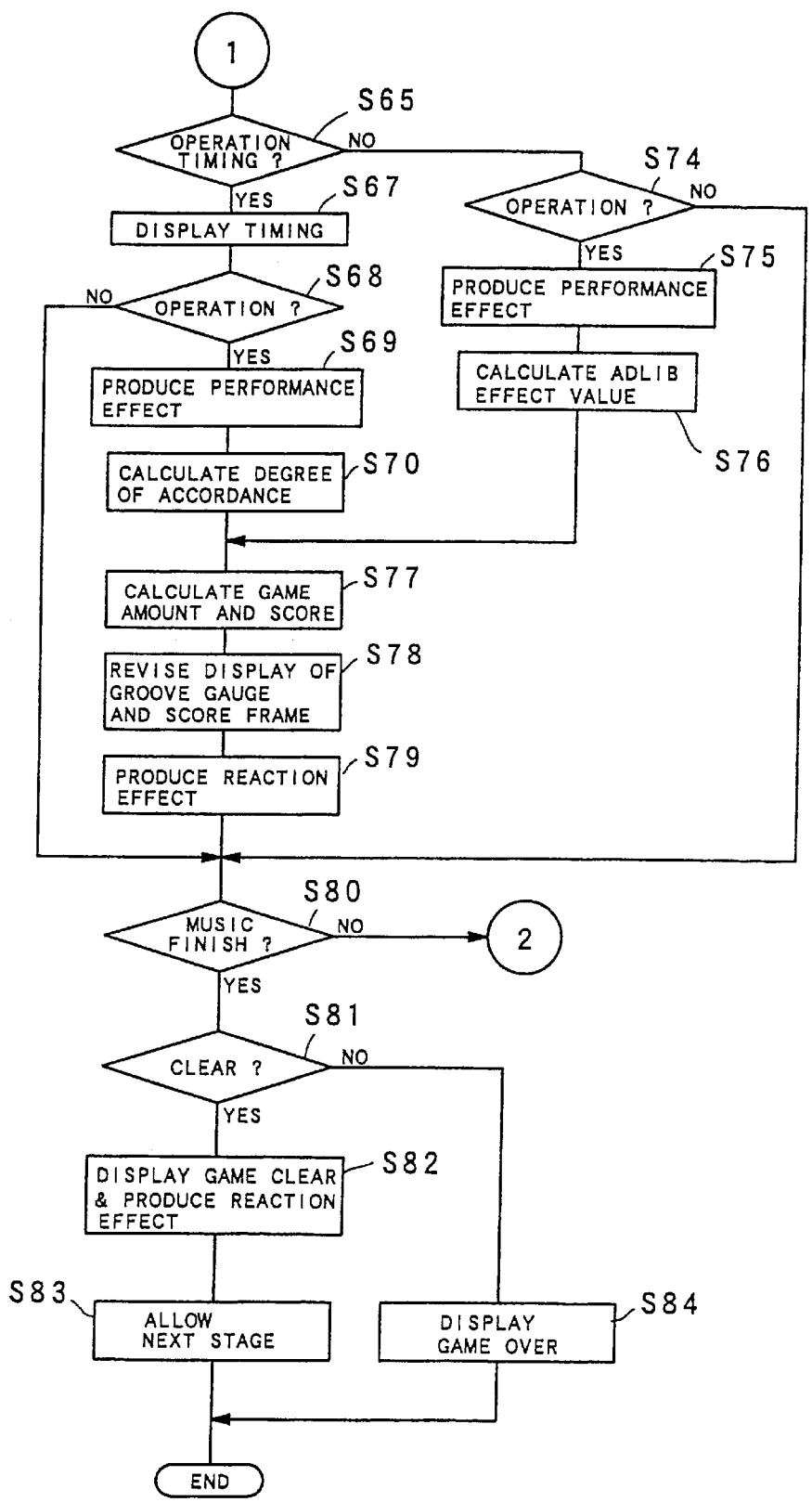
FIG. 17 is a flow chart following FIG. 16.
Figure 1:
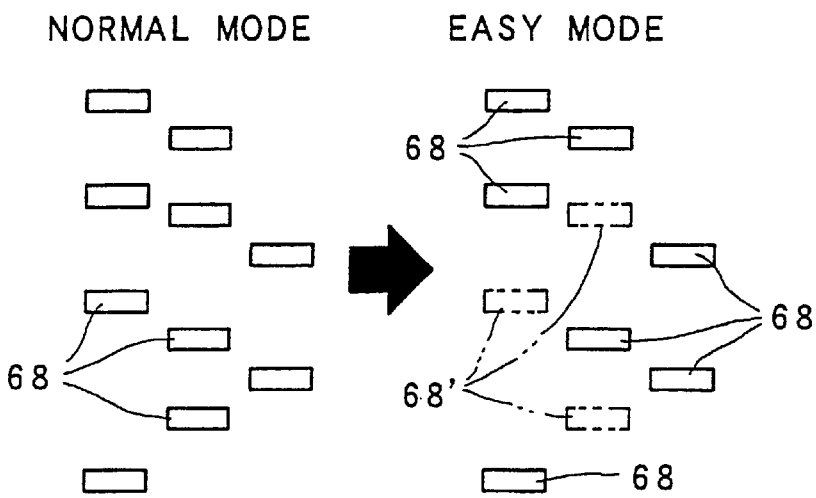
Figure 1:
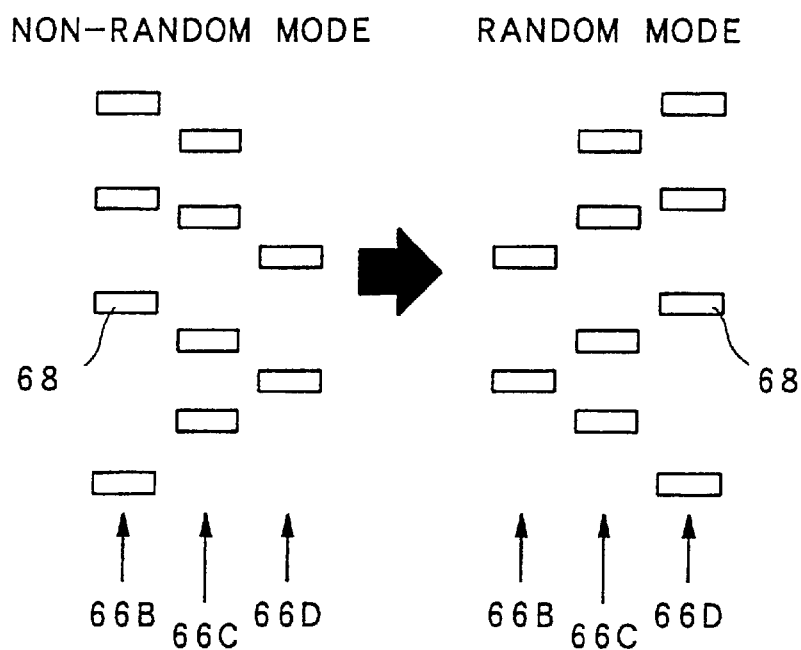

FIGS. 16 and 17 are flow charts showing a procedure for one stage executed by the CPU 50. In this procedure, first of all, a mode select step in which the player is requested to select one of the easy mode and the normal mode is executed in an interactive manner through the monitor 6 (step S51). The easy mode is a mode in which the game is carried out on the basis of the operation timing data and the automatic play timing data for the easy mode (refer to FIG. 14), and the normal mode is a mode in which the game is carried out on the basis of the operation timing data and the automatic play timing data for the normal mode In the easy mode, difficulty of the operation indicated through the indicator 65 is easier than that in the normal mode. For example, if the display of the indicator 65 at the specific time in the normal mode is set as illustrated in the left side of FIG. 18, some of the index marks 68' are omitted at the same time in the easy mode as illustrated by imaginary lines in the right side of FIG. 18. As a result, the total number of the index marks displayed in the easy mode through the entire play of the music composition is less than that in the normal mode. Therefore, the player can operate the keys 15 and the slide disk 23 with composure in comparison with the normal mode. FIG. 18 shows the arrangement of the marks 68 with respect only to three rows of the tracks, however, the omission of the marks may be performed in all of the tracks 66A to 66E and 67, or only in a part of the rows of the tracks.

In case that the display of the marks 68' is omitted in the easy mode, the player need not perform the operation corresponding to the omitted mark 68', so that the performance effect to be mixed with the BGM is not produced. Therefore, the performance of the music in the easy mode may be monotonous in comparison with that in the normal mode. In this case, there is a possibility that the interest of the game reduces. In order to avoid this situation, the automatic play timing data for the easy mode features commands to produce automatically the sound effect which corresponds to the omitted marks 68' at the timing when the mark 68' would reach to the performance operation position PP (refer to FIG. 10) if the display of the mark 68' were not omitted. Thus, in case that the automatic play timing data for each of the normal mode and the easy mode are compared with each other with respect to the same musical composition X, the number of commands to produce the sound effect issued on the basis of the data for the easy mode is greater than that for the normal mode. The automatic play timing data for the normal mode is not essential for the game. Therefore, it is possible to omit the automatic play timing data for the normal mode, and every sound effect with respect to the composition X may be produced only in response to the operations of the keys 15 and the slide disk 23.

After selecting the mode at the step S51 of FIG. 16, the CPU 50 sequentially loads the wave form data and the wave form table data associated with the music assigned to the current stage (steps S52, S53). These data are common to both of the easy mode and the normal mode. Next at the step S53, the CPU 50 judges whether the easy mode is selected or not. If the normal mode is selected, the CPU 50 loads the operation timing data and the automatic play timing data for the normal mode (step S55). On the contrary, if the easy mode is selected, the CPU 50 loads the operation timing data and the automatic play timing data for the easy mode (step S56).

After loading the data at the step S55 or S56, the CPU 50 introduces the contents of the stage to the player (step S59), and then starts the play of the music (step S60). These steps are similar to the above-mentioned step S2 or S3 in FIG. 12. Simultaneously with the start of the music, the CPU 50 starts clocking to watch the current time tx (FIG. 15), that is, the time currently passed from the start of the music play. Next at the step S61, the CPU 50 obtains the data for the indicator. Namely, the operation timing data from the current time tx to the time ty is loaded into the pre-read buffer area in FIG. 15, and then the data from the current time tx to the time tn which corresponds to two measures of the music is loaded into the display buffer area.

Next at the step S62, the CPU 50 judges whether a random mode is currently selected or not. If the random mode is selected, the CPU 50 changes the relationship between the operation timing data loaded into the display buffer area and the key tracks 66A to 66E for changing the display of the marks 68 in the indicator 65 in such a manner that the arrangement of the marks 68 is reversed in the lateral direction with the center track 66C being as an axis in comparison with the arrangement in a non-random mode as illustrated in FIG. 19 (step S63). After this, the procedure proceeds to the step S64. Note that, FIG. 19 shows only three rows of the tracks 66B, 66C and 66D, however, the marks 68 in the left and right end tracks 66A and 66E are exchanged with each other. The relationship between each of the tracks 66A to 66E and the marks 68 in the random mode is not limited to the embodiment in which the arrangement of the marks 68 is reversed in the lateral direction against the non-random mode. For example, the each marks 68 may be deviated by one row in the lateral direction, or exchanged between any two tracks, and various changes with respect to the arrangement of the marks 68 may be applied in the random mode.

The reason why the random mode is prepared is as follows. In the game machine 1, the player will learn the sequence of the operation of the keys 15 through repeating the play of the same music, and will be able to play the appropriate set of operations without checking the display in the indicator 65. In this case, there is a possibility that the difficulty of the game relatively reduces and the player loses the interest in the game. However in the game machine 1 of this embodiment, since the arrangement of the marks 68 is reversed in the lateral direction in the random mode, it is possible to throw the player into confusion such that the indicator 65 indicates the operation of the key 15E when the player expects to operate the key 15A in accordance with his memory. Therefore, it is possible to prevent the player from being skilled in the operation and to prevent the decrease of the difficulty of the game, thereby keeping the interest of the player in the game for a long time. The random mode may be selectable by the player, or the game machine 1 automatically select the random mode when a predetermined condition is satisfied. For example, if the player gets a result which exceeds the predetermined level in the past stages, the game machine 1 will automatically select the random mode for the next stage. The game machine 1 may comprise a clock circuit and select the random mode in the specific time zone in a day. The judgement as to whether or not the game is currently in the random mode may be carried out, for example, by using a flag and distinguishing the value thereof.

On the other hand, if it is judged at the step S62 that the game is not in the random mode, the process proceeds to the step S64 with omitting the step S63. At the step S64, the CPU 50 revises the positions of the marks 68 and 69 in the indicator 65 on the basis of the data loaded into the display buffer area. The marks 68 and 69 can be moved downward in the indicator 65 in accordance with the progress of the play of the music by cyclically repeating the revision of the display of the marks. After the step S64, the process proceeds to the step S65 in the FIG. 17.

At the step S65, the CPU 50 judges whether the operation timing of each of the keys 15 and the slide disk 23 comes or not on the basis of the current time and the operation timing data. At this step, if the current time is in a time range which is set so as to include operation timing designated by the operation timing data and to have a predetermined width, it is possible to consider the current time as the operation timing. If it is judged that the operation timing comes, the CPU 50 gives the player the indication of the operation timing similarly at the step S6 in FIG. 6 (step S67). After the indication of the operation timing, the CPU 50 judges whether any one of the keys 15A to 15E, the slide disk 23 and the push button switches 31A to 31C is operated or not in the above-mentioned time range. If it is judged that the operation is performed, the CPU 50 produces the performance effect corresponding to the operation (step S69). The performance effect at this step may be producing sound effect through the loud speakers 8A to 8C, and blinking the illumination lamps 7A and 7B in association with the operation performed by the player. The relationship between the operation of each operation member, that is, the keys 15A to 15E and the push button switches 31A to 31C, and the sound effect is set as illustrated in FIG. 8. If in the random mode, the relationship between each key 15 and the sound effect is changed similarly to the display arrangement of the indicator 65. For example, if the key 15E is operated in the random mode, the CPU 50 considers the operation to be an operation of the key 15A and produces the sound effect assigned to the key A in FIG. 8.

After producing the performance effect, the CPU 50 calculates the degree of the accordance between the operation of the player and the operation timing defined by the operation timing data similarly at the step S9 in FIG. 12 (step S70). At this step, if the game is in the random mode, the relationship between each of the keys A to E illustrated in FIG. 7 and each of the keys 15A to 15E is changed similarly to the display arrangement of the indicator 65. For example, if the key 15E is operated in the random mode, the CPU 50 considers the operation to be an operation of the key 15A and compares the operated time with the operation timing with respect to the key A illustrated in FIG. 7.

If it is judged at the step S65 that the operation timing does not come, the CPU 50 omits the above-mentioned indication of the operation timing, and judges whether any one of the keys 15A to 15E, the slide disk 23 and the push button switches 31A to 31C is operated or not (step S74). If it is judged that the operation is performed, the CPU 50 produces the performance effect corresponding to the operation (step S75). At this time, the performance effect may also be producing sound effect through the loud speakers 8A to 8C, and blinking the illumination lamps 7A and 7B performed in association with the operation of the player. After this, the CPU 50 calculates the adlib effect value similarly at the step S12 of FIG. 12.

After the calculation at the step S70 or S76, the CPU 50 calculates the amount of the groove gauge 61, that is, the length of the bar 61*b* and scores to be displayed in the score frames 62A and 62B on the basis of the result of the above-mentioned calculation(step S77). This step is similar to the step S12 in FIG. 13. After the calculation, the CPU 50 revises display states of the groove gauge 61 and the score frames 62A and 62B on the basis of the calculated result (step S78), and then produces the reaction effect on the basis of the degree of the association or the adlib effect value calculated at the step S70 or S76 (step S79). This step is similar to the step S15 in FIG. 15. After producing the reaction effect, or judged at the step S68 or S74 that the operation is not performed, the CPU 50 judges whether the play of the music finishes or not (step S80), and if the play does not finish, the process returns to the step S61 in FIG. 16. If the play of the music finishes at the step S80, the CPU 50 judges whether the player clears the stage or not similarly at the step S21 in FIG. 12 (step S81). If it is judged that the stage is cleared, the CPU 50 displays the image informing the player that the stage is cleared as in the case at the step S22 in FIG. 12, and also produces the predetermined reaction effect (step S82).

At the next step S83, the CPU 50 allows the player to advance to the next stage, and then finishes the process for the current stage. On the other hand, if it is judged at the step S81 that the stage is not cleared, the CPU 50 displays an image representing that the game is over (step S84), and then finishes the process for the current stage. In this case, since the advance to the next stage is not allowed, the game is finished.

The present invention is not limited to the above embodiments, and is carried out in various embodiments. For example, the turntable input unit 14 may be provided with a motor connected with the rotary shaft 22 through a slide type clutch to rotate the slide disk 23 during the game play, thereby imitating the rotation of the phonograph record disk. In this case, the manual operation of the slide disk 23 performed by the player causes the acceleration of the slide disk 23 which can be detect on the basis of the signals issued from the sensors 27A and 27B; therefore it is possible to produce and change the scratch sound effect in accordance with the acceleration of the slide disk 23. The game machine 1 may be provided with a communication device, and the music data and the performance procedure data stored in the auxiliary storage device 56 may be rewritten at any time from a remote location. This case allows the game machine 1 to always provide the player with up-to-date music.

Figure 20:
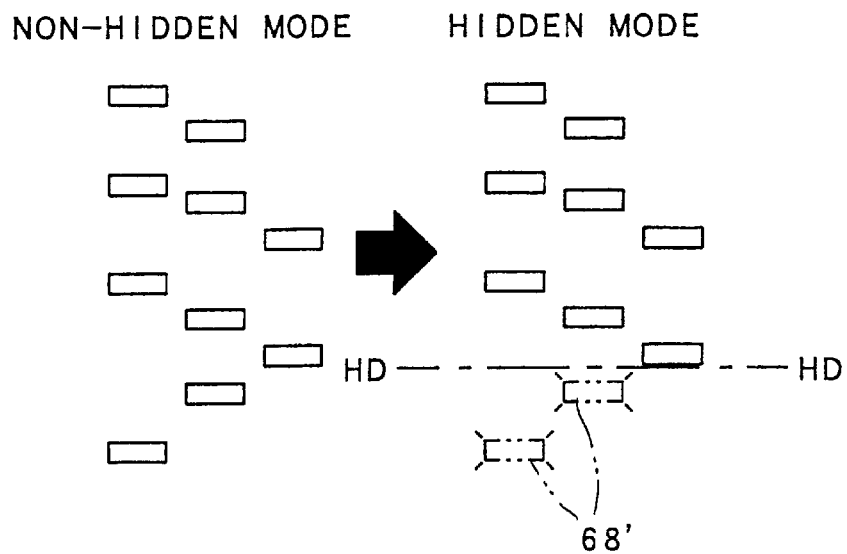
FIG. 20 is a diagram illustrating display examples of the indicator in a hidden mode and a non-hidden mode.

The display manner of the index marks 68 and 69 in the indicator 65 may be changed besides the above-mentioned embodiments. FIG. 20 shows an example in which a hidden mode is prepared. In the hidden mode, after each of the marks 68 and 69 reaches to a position HD in the indicator 65, at least a part of the marks 68 and 69 is hidden as illustrated by imaginary lines and denoted by a reference numeral 68'. However, the estimation of the operation is determined in the same way as that in a non-hidden mode. Therefore, in order to clear the stage, the player has to operate keys 15 with expecting the timing at which the hidden marks 68' will reach the performance operation position PP. Accordingly, the difficulty of the game increases. Such control in the hidden mode can be carried out by the steps of: deleting the designations of the operation timing, which is included in a range from the current time to a time corresponding to the position HD of the indicator 65, with respect to the operation timing data loaded into the display buffer area, and comparing the actual operation performed by the player with the operation timing data originally recorded in the performance data (refer to FIG. 13A) at each step for estimating the operation, for example, at the step S70, S76 or S77 in FIG. 17. FIG. 20 shows the marks 68 for the key tracks 15, however, the hidden mode may be applied to the marks 69 in the turntable track 67.

Figure 21:
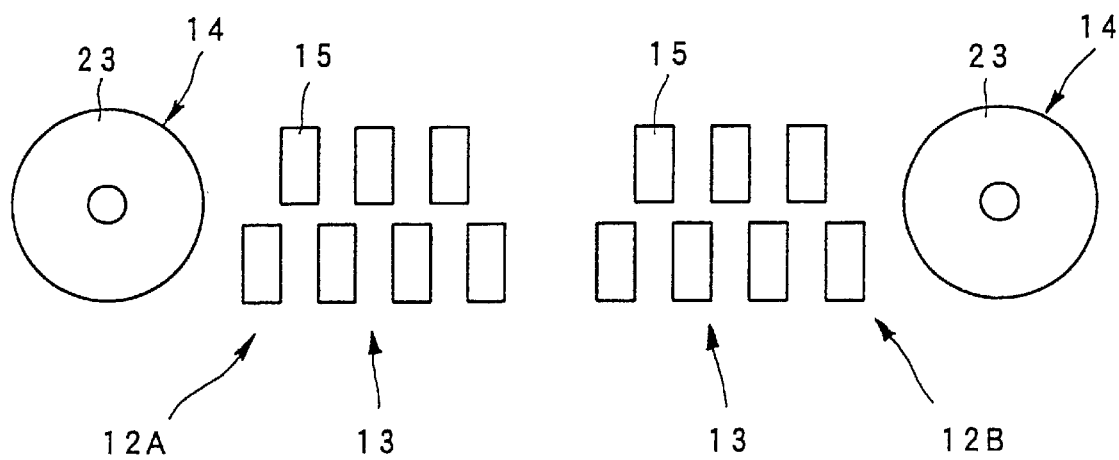
FIG. 21 is a view showing a modification of performance operation sections.

FIG. 21 shows an embodiment in which the configurations of the operating sections 12A and 12B are modified. In this embodiment, the operating sections 12A and 12B are arranged symmetrically in the lateral direction of the control panel 10. Namely, the turntable input unit 14 is disposed at the left side of the keyboard input device 13 in the left side operating sections 12A, while the unit 14 disposed at the right side of the unit 13 in the right side operating section 12B. According to this arrangement, in case that the single player inserts coins enough for two players and selects the 2P mode, the two sections 12A and 12B are arranged in the lateral direction near the hands of the player who stands at the center position of the game machine 1 in the lateral direction thereof, so that the player can easily operate the operating members in both of the sections 12A and 12B. In the embodiment of FIG. 21, the number of the keys 15 in each section 12 is changed to seven. However, the present invention is not limited to the embodiment of providing each section 12 with the five or seven keys 15, the number of the keys 15 may be changed variously.

Figure 22:
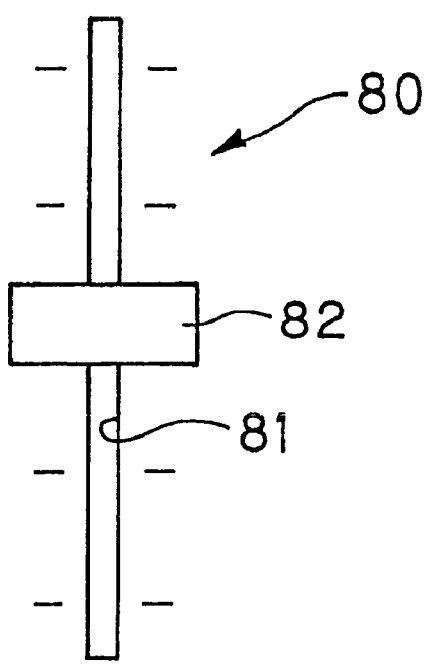
FIG. 22 is a plan view showing a slide type volume switch prepared for the performance operation.

Besides the keys 15 and the slide disk 23, the operation input device may be provided with a slide type volume switch 80 illustrated in FIG. 22. The switch 80 comprises a slit 81 extending in the vertical direction of FIG. 22 and a knob 82 slidably operable along the slit 81, and is capable of issuing signals corresponding to the position of the knob 82. The slide type volume switch 80 may use as an operation member for mixing the BGM or the sound effect added thereon with another special effect. The special effect may include a so-called surround effect, a change of the musical key, a cutting of a vocal part from the BGM, and an equalizing effect for high or low frequency band. The degree of addition of these effect may be changed in accordance with the position of the knob 82. In one preferable example of using the slide type volume switch 80, the movable range of the knob 82 is divided into a plurality of sections, e.g. five sections, and the CPU 50 detects which section the knob 82 is located in. Then, the CPU 50 changes the degree of addition of the special effect in accordance with location of the knob 82. A plurality of the slide type volume switches 80 may be provided in the game machine 1.

Figure 23A:
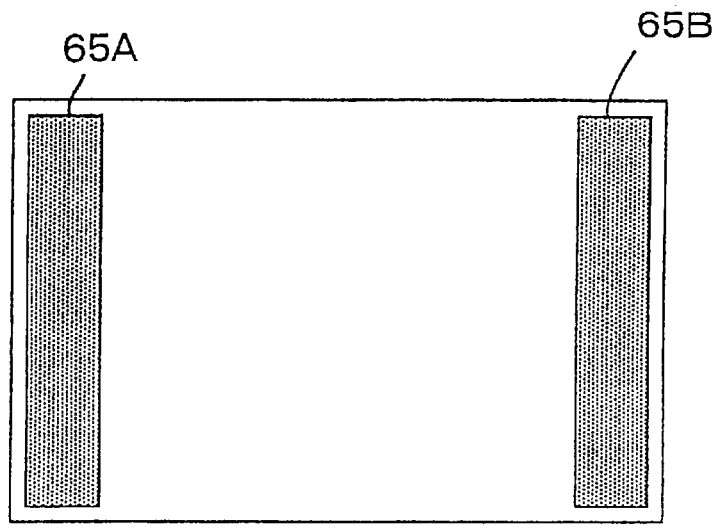
FIGS. 23A and 23B are diagrams showing an embodiment in which display positions of the indicators on the screen are changeable between left and right side ends of the screen and the center thereof.
Figure 23B:
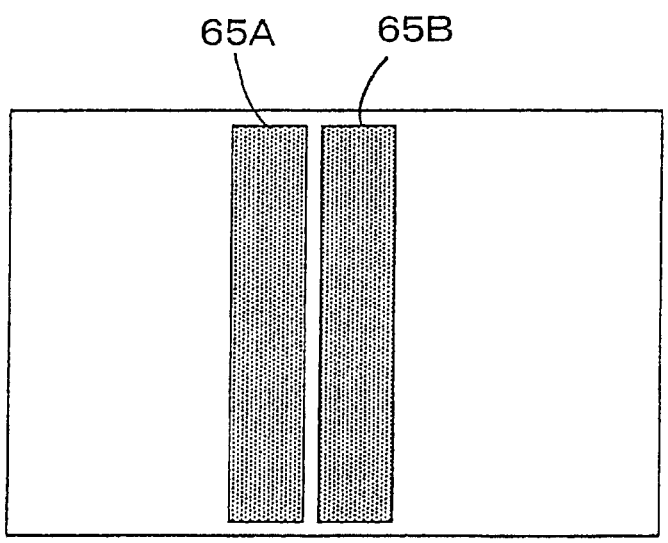

FIGS. 23A and 23B show an embodiment in which the positions of the indicators 65A and 65B in the screen are changeable. In this embodiment, two modes are provided with respect to the display of the indicators 65. In one mode, the indicators 65A and 65B are displayed at the both ends of the screen in the lateral direction thereof (refer to FIG. 23A) and in the other mode, the indicators 65A and 65B are displayed so as to be arranged side by side at the center of the screen (refer to FIG. 23B). The latter mode has advantage that the player who stands at the center of the game machine 1 can easily confirm both indicators 65A and 65B, and this arrangement may be most effective when the single player selects the 2P mode. In case that the coins enough for two players are inserted at the start of the process of FIG. 12 or FIG. 16, the process may further comprises a step for requesting the player to select one mode among the 1P mode, a 2P mode for a single player and a 2P mode for two players, and the CPU 50 may control the process in such a manner that the mode of FIG. 23A is automatically selected in response to the selection of the 1P mode or the 2P mode for the two players, while the mode of FIG. 23B is automatically selected in response to the selection of the 2P mode for the single player. The mode of FIG. 23B and the arrangement of FIG. 21 may be associated with each other to thereby provide the player with comfortable operation environment.

In the above-mentioned embodiment, the data concerning the performance procedure, for example the performance data of FIG. 14, is prepared separately for each of the performance operating sections 12A and 12B, and the two players operate the respective input units 13 and 14 to complete the performance of the BGM in cooperation with each other. However, the present invention is not limited to such a manner. The same data for the performance procedure may be used for both operating sections 12A and 12B, the indicators 65A and 65B may indicate the same operation, and the operations may be estimated separately for each of the sections 12A and 12B to separately display the estimated scores in the respective score frames 62A and 62B. In this case, it is possible to provide the two players with pleasure of competing with each other for the high score similarly in case of a so-called battle fighting game. Also, it is not necessary to define a plurality of the performance procedures in the performance data for one piece of the BGM, and this fact causes the performance data to decrease its size. Therefore, if a capacity of the auxiliary storage device 56 which can be used for the data is restricted, it is possible to increase the numbers of the music stored in the restricted capacity. Thus, it is possible to increase, for example, the numbers of the stages shown in FIG. 11.

In the above mentioned embodiment, the CPU 50 works as various devices necessary for processing the game by being combined with a particular software, however a part or all of the devices can be replaced with a logical circuit.

What is claimed is:

1. A music action game machine comprising:

a main body;

an operation input device disposed on a front side of the main body so as to be adjacent to hands of a player facing the front side of the main body, the operation input device having a plurality of operation members;

a storage device for storing data of a musical composition and data of a performance procedure associated with the musical composition;

a music play device for playing the musical composition based on the data stored in the storage device;

an operation instructing device for giving the player a visual instruction to operate the operation members in accordance with progress of a play of the musical composition based on the data stored in the storage device;

an effect producing device for producing a performance effect in response to a performance operation performed by the player to each of the operation members;

an estimation device for estimating the performance operation of the player based on a relationship between the performance procedure defined by the data stored in the storage device and the performance operation of the player; and an estimation informing device for informing the player of an estimation result determined by the estimation device, wherein the operation input device comprises a disk-shaped operation member as one of the operation members, the disk-shaped operation member being operable so as to be turned about an axis thereof, and wherein the effect producing device produces a scratch sound effect as the performance effect in response to a turning operation of the disk-shaped operation member, said scratch sound effect being similar to an actual scratch sound produced by irregularly turning a phonograph record disk with keeping contact between the phonograph record disk and a stylus of a phonograph player.

2. The music action game machine according to claim 1, wherein said main body is provided with a control panel having operating sections to be located at left and right sides thereof, and each of the operating sections includes the disk-shaped operation member.

3. The music action game machine according to claim 2, wherein said main body is provided with a monitor, said operation instructing device displaying indicators for instructing the performance operation at right and left sides of the monitor and displaying in the indicators index marks for indicating operation timing of the disk-shaped operation member so as to be movable in a vertical directions.

4. The music action game machine according to claim 2, wherein different performance procedures are set for the respective operating sections to carry out a game play like a musical dialogue or duet.

5. The music action game machine according to claim 2, wherein said effect producing device changes the scratch sound effect in accordance with a turning direction of the disk-shaped operation member.

6. The music action game machine according to claim 2, wherein said operation input device is provided with a slidably operable knob, and said effect producing device adds another special effect to the performance effect in accordance with operation of said knob.

7. A music action game machine comprising:

a main body;

an operation input device disposed on a front side of the main body so as to be adjacent to hands of a player facing the front side of the main body, the operation input device having a plurality of operation members;

a storage device for storing data of a musical composition and data of a performance procedure associated with the musical composition;

a music play device for playing the musical composition based on the data stored in the storage device;

an operation instructing device for giving the player a visual instruction to operate the operation members in accordance with progress of a play of the musical composition based on the data stored in the storage device;

an effect producing device for producing a performance effect in response to a performance operation performed by the player to each of the operation members;

an estimation device for estimating the performance operation of the player based on a relationship between the performance procedure defined by the data stored in the storage device and the performance operation of the player; and an estimation informing device for informing the player of an estimation result determined by the estimation device, wherein the operation instructing device comprises:

an indicator disposed on the front side of the main body and provided with at least one track extending in a predetermined direction;

a mark indicating device capable of indicating index marks each of which is provided for indicating operation timing of each of the operation members, in such a manner that each of the index marks moves along the track and then reaches to a fixed operation position defined in the track when the operation timing associated with each of the index marks comes, and wherein the mark indicating device changes a length of each of the index marks in said predetermined direction in accordance with a length of an operation continuation time during which each of the operation members must be operated.

8. The music action game machine according to claim 7, wherein the estimation device estimates the performance operation with referring to a relationship between the performance procedure stored in the storage device and said length of the operation continuation time.

9. A music action game machine comprising:

a main body;

an operation input device disposed on a front side of the main body so as to be adjacent to hands of a player facing the front side of the main body, the operation input device having a plurality of operation members;

a storage device for storing data of a musical composition and data of a performance procedure associated with the musical composition;

a music play device for playing the musical composition based on the data stored in the storage device;

an operation instructing device for giving the player a visual instruction to operate the operation members in accordance with progress of a play of the musical composition based on the data stored in the storage device;

an effect producing device for producing a performance effect in response to a performance operation performed by the player to each of the operation members;

an estimation device for estimating the performance operation of the player based on a relationship between the performance procedure defined by the data stored in the storage device and the performance operation of the player; and an estimation informing device for informing the player of an estimation result determined by the estimation device, wherein the effect producing device produces sound effects different from each other in response to respective operations of the operation members, each of the sound effects corresponding to said performance effect, and wherein a relationship between each of the operation members and the sound effect to be produced in response to the operation thereto is changed in accordance with the progress of the play of the musical composition.

10. A music action game machine comprising:

a main body;

an operation input device disposed on a front side of the main body so as to be adjacent to hands of a player facing the front side of the main body, the operation input device having a plurality of operation members;

a storage device for storing data of a musical composition and data of a performance procedure associated with the musical composition;

a music play device for playing the musical composition based on the data stored in the storage device;

an operation instructing device for giving the player a visual instruction to operate the operation members in accordance with progress of a play of the musical composition based on the data stored in the storage device;

an effect producing device for producing a performance effect in response to a performance operation performed by the player to each of the operation members;

an estimation device for estimating the performance operation of the player based on a relationship between the performance procedure defined by the data stored in the storage device and the performance operation of the player; and an estimation informing device for informing the player of an estimation result determined by the estimation device, wherein the main body has a plurality of operating sections, each of which is provided with the operation input device;

the estimation device estimates the performance operation separately for each of the operating sections; and the estimation informing device informs the estimation result separately for each of the operating sections.

11. A storage device readable by a computer which stores data defining a procedure for operating operation members provided in each of operating sections in a game system in association with a predetermined music, and a program for instructing a player to operate the operation members through a screen of a display device provided in the game system, said program being prepared for causing the computer to execute steps of:

displaying an image of an instruction on the screen of the display device to operate the operation members based on the data defining the procedure;

producing a performance effect in response to an operation of the operation members performed by the player;

estimating the operation of the operation members based on a relationship between the data defining the procedure and the operation performed by the player; and informing a result of said estimating step to the player, wherein said program is configured such that the same performance procedure is instructed to each of the operating sections with respect to the same musical composition at said displaying step, the performance operation is separately estimated for each of the operating sections at said estimation step, and the estimation result is separately informed for each of the operating sections at said informing step.

12. A storage device readable by a computer which stores data defining a procedure for operating operation members provided in each of operating sections arranged in a lateral direction in a game system in association with a predetermined music, and a program for instructing a player to operate the operation members through a screen of a display device provided in the game system, said program being prepared for causing the computer to execute steps of:

displaying an image of an instruction on the screen of the display device to operate the operation members based on the data defining the procedure;

producing a performance effect in response to an operation of the operation members performed by the player;

estimating the operation of the operation members based on a relationship between the data defining the procedure and the operation performed by the player; and informing a result of said estimating step to the player, wherein a display manner of the display device at said displaying step can be changed between a first display mode and a second display mode, the first display mode being prepared to display images for indicating timing of the performance operation on the screen of the display device with leaving a space between each of the images in the lateral direction in accordance with an arrangement of the operating sections, and the second display mode being prepared to display the images for indicating timing in such a manner that a space therebetween is less than that in the first display mode.

* * * * *